(12) United States Patent
Liao et al.

(10) Patent No.: US 12,482,909 B2
(45) Date of Patent: Nov. 25, 2025

(54) LIQUID INJECTION DEVICE, BATTERY PRODUCTION LINE AND LIQUID INJECTION METHOD

(71) Applicant: CONTEMPORARY AMPEREX TECHNOLOGY CO., LIMITED, Ningde (CN)

(72) Inventors: Hongyan Liao, Ningde (CN); Jian Zhang, Ningde (CN); Feng Guan, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/240,665

(22) Filed: Jun. 17, 2025

(65) Prior Publication Data
US 2025/0323402 A1  Oct. 16, 2025

Related U.S. Application Data

(63) Continuation of application No. PCT/CN2024/113770, filed on Aug. 21, 2024.

(30) Foreign Application Priority Data

Apr. 15, 2024  (CN) .......................... 202410449989.8

(51) Int. Cl.
*H01M 2/36* (2006.01)
*H01M 50/645* (2021.01)

(52) U.S. Cl.
CPC .................. *H01M 50/645* (2021.01)

(58) Field of Classification Search
CPC ........................................... H01M 50/60–691
See application file for complete search history.

(56) References Cited

U.S. PATENT DOCUMENTS 2,488,573 A * 11/1949 Wood .................. H01M 50/609
  137/557
5,731,099 A *  3/1998 Badger ............... H01M 50/673
  137/260

(Continued)

FOREIGN PATENT DOCUMENTS

CN  201741764 U   2/2011
CN  107394103 A  11/2017

(Continued)

OTHER PUBLICATIONS

International Search Report in the international application No. PCT/CN2024/113770, mailed on Dec. 23, 2024. 8 pages with English translation.

(Continued)

*Primary Examiner* — Nicolas A Arnett
(74) *Attorney, Agent, or Firm* — ANOVA LAW GROUP, PLLC

(57) ABSTRACT

A liquid injection device comprises a liquid injection apparatus comprising: a battery clamp provided with at least one battery accommodating groove having a set position therein, a position adjustment mechanism configured to be capable of adjusting a battery that has been put in the battery accommodating groove and not located at the set position to the set position, and a liquid injection mechanism configured to be capable of butting to a liquid injection port of the battery located at the set position, and performing a liquid injection operation of injecting an electrolyte into the battery. For a battery that is not located at the set position, position adjustment is performed with the position adjustment mechanism such that the battery moves to the set position.

20 Claims, 32 Drawing Sheets

(56) References Cited

U.S. PATENT DOCUMENTS

| | | | | |
|---|---|---|---|---|
| 5,992,477 | A * | 11/1999 | Tiegel | H01M 50/673 |
| | | | | 141/192 |
| 6,120,929 | A * | 9/2000 | Stocchiero | H01M 50/147 |
| | | | | 137/260 |
| 7,029,786 | B2 * | 4/2006 | Campau | H01M 50/609 |
| | | | | 137/260 |
| 8,047,241 | B2 * | 11/2011 | Reschke | H01M 50/627 |
| | | | | 137/260 |
| 11,777,184 | B2 * | 10/2023 | Cai | H01M 50/148 |
| | | | | 429/50 |
| 12,095,120 | B2 * | 9/2024 | Xiao | H01M 50/618 |
| 2022/0367996 | A1 * | 11/2022 | Chen | H01M 50/308 |
| 2023/0395959 | A1 * | 12/2023 | Pan | H01M 50/645 |
| 2024/0363891 | A1 * | 10/2024 | Yang | H01M 50/209 |

FOREIGN PATENT DOCUMENTS

| | | | |
|---|---|---|---|
| CN | 105552300 | B | 6/2018 |
| CN | 109755458 | B | 8/2021 |
| CN | 111463493 | B | 6/2022 |
| CN | 216793796 | U | 6/2022 |
| CN | 217214842 | U | 8/2022 |
| CN | 219078447 | U | 5/2023 |
| CN | 116417764 | A | 7/2023 |
| CN | 219739265 | U | 9/2023 |
| CN | 117497972 | A | 2/2024 |
| CN | 118040266 | A | 5/2024 |
| JP | 2004247120 | A | 9/2004 |
| KR | 20240012858 | A | 1/2024 |
| WO | 2023092449 | A1 | 6/2023 |

OTHER PUBLICATIONS

Written Opinion of the International Search Authority in the international application No. PCT/CN2024/113770, mailed on Dec. 23, 2024. 12 pages with English translation.

Notification of Examination Opinion on Request for Expedited Pre-Examination regarding Chinese Application No. 202410449989.8, issued on Apr. 12, 2024. 6 pages with English translation.

First Office Action of the Chinese application No. 202410449989.8, issued on May 18, 2024. 28 pages with English translation.

Second Office Action of the Chinese application No. 202410449989.8, issued on Jun. 8, 2024. 30 pages with English translation.

Decision of Rejection of the Chinese application No. 202410449989.8, issued on Aug. 19, 2024. 25 pages with English translation.

Tang Yi et al., "UAV power system", Beijing Institute of Technology Press, Mar. 2023, p. 156.

* cited by examiner

LIQUID INJECTION DEVICE, BATTERY PRODUCTION LINE AND LIQUID INJECTION METHOD

CROSS-REFERENCE TO RELATED APPLICATIONS

The present application is a continuation of International Application No. PCT/CN2024/113770, filed on Aug. 21, 2024, which claims priority to Chinese Patent Disclosure No. 202410449989.8 filed on Apr. 15, 2024 and entitled "LIQUID INJECTION DEVICE, BATTERY PRODUCTION LINE AND LIQUID INJECTION METHOD", the entire contents of both of which are incorporated herein by reference.

TECHNICAL FIELD

The present disclosure relates to the technical field of battery manufacturing, and in particular, to a liquid injection device, a battery production line, and a liquid injection method.

BACKGROUND

New energy batteries are more and more widely applied in life and industry. For example, new energy vehicles equipped with batteries have been widely used. Additionally, batteries are also increasingly applied in the fields of energy storage or the like. In new energy vehicles equipped with batteries, the batteries may be used to provide all or part of the power. In the field of energy storage, batteries may be mounted in energy storage boxes or directly on the user side.

In the production process of batteries, there is a battery liquid injection procedure after a bare battery cell is put in a case. First, a liquid outlet nozzle of a liquid injection device is butted to a liquid injection port of a battery, and then an electrolyte is injected into the battery through the liquid outlet nozzle. The accuracy of butting of the liquid outlet nozzle to the liquid injection port of the battery is related to the success rate of battery liquid injection. Therefore, how to improve the accuracy of butting of the liquid outlet nozzle of the liquid injection device to the liquid injection port of the battery is one of the topics that the industry need to study.

SUMMARY

In order to solve the above technical problems, the present disclosure provides a liquid injection device, a battery production line, and a liquid injection method, which can improve the accuracy of butting to a liquid injection port of a battery.

The present disclosure is implemented through the following technical solutions.

A first aspect of the present disclosure provides a liquid injection device, including a liquid injection apparatus, the liquid injection apparatus including: a battery clamp, the battery clamp being provided with at least one battery accommodating groove, the battery accommodating groove having a set position therein; a position adjustment mechanism, the position adjustment mechanism being configured to be capable of adjusting a battery that has been put in the battery accommodating groove and is not located at the set position to the set position; and a liquid injection mechanism, the liquid injection mechanism being configured to be capable of butting to a liquid injection port of the battery located at the set position and performing a liquid injection operation of injecting an electrolyte into the battery; an upper portion of the battery accommodating groove being provided with an access groove mouth, the position adjustment mechanism being configured to be capable of pressing the battery from top down such that the battery moves to the set position within the battery accommodating groove.

When liquid injection is performed on the battery with the liquid injection device provided by the present disclosure, the battery is first put in the battery accommodating groove of the battery clamp. For the battery that is not located at the set position, position adjustment is performed with the position adjustment mechanism such that the battery moves to the set position. Since the position of the battery is corrected, the liquid injection mechanism can be accurately butted to the liquid injection port of the battery, thereby enabling improvement in the accuracy of butting of the liquid injection mechanism to the liquid injection port of the battery.

The access groove mouth is provided in the upper portion of the battery accommodating groove, such that a putting-in direction for the battery is from top down, that is, the battery needs to be mounted within the battery accommodating groove from top down. In this case, after the battery is put through the access groove mouth from top down, the battery may be released. The battery automatically moves down under the action of gravity and continues to enter the battery accommodating groove. A pushing action of continuing to push the battery in may be omitted, which is conducive to improving the efficiency of operation. In the case that the battery is stuck and cannot continue to move down, resulting in inability to move to the set position, the battery may be pushed to the set position by means of the position adjustment mechanism pressing the battery from top down, thereby enabling regulation of the battery position. Such regulation means is simple in action and has high regulation efficiency.

In some embodiments, the liquid injection apparatus further includes a detection apparatus, the detection apparatus being configured to be capable of detecting whether the battery put in each of the battery receiving grooves is located at each of the set positions, and if it is detected that at least one battery is not located at the set position, adjusting the battery that is not located at the set position to the set position through the position adjustment mechanism.

Through the detection by the detection apparatus, it is possible to judge whether the battery put in the battery clamp needs to be subjected to position adjustment. The position adjustment mechanism is used when needed, and the position adjustment mechanism may not be used when not needed. As such, automatic detection is achieved, the accuracy and efficiency of detection are improved, and useless operations performed by the position adjustment mechanism may further be reduced, improving the operational efficiency of battery liquid injection.

In some embodiments, if the battery is fully accommodated within the battery accommodating groove, the battery is located at the set position. The detection apparatus is disposed outside the access groove mouth. If part of the battery extends out of the battery accommodating groove from the access groove mouth, the detection apparatus is triggered.

When the battery is located at the set position, the battery is fully accommodated within the battery accommodating groove, which may improve the limiting effect of the battery accommodating groove for the battery and improve the position stability of the battery, thus facilitating the improvement in the butting accuracy for the liquid injection mechanism and the battery. Furthermore, the detection apparatus judges whether the battery is located at the set position by detecting whether the battery extends out of the access groove mouth, enabling an automatic detection function and improving the accuracy and efficiency of detection.

In some embodiments, the liquid injection apparatus further includes a moving mechanism. The battery clamp is provided at the moving mechanism, and capable of moving between a detection position, an adjustment position, and a liquid injection position under the action of the moving mechanism. The detection apparatus detects the battery within the battery clamp located at the detection position. If it is detected that at least one battery is not located at the set position, the moving mechanism moves the battery clamp to the adjustment position such that the position adjustment mechanism adjusts the battery, and if it is detected that each of the batteries is located at each of the set positions, the moving mechanism moves the battery clamp to the liquid injection position such that the liquid injection mechanism injects an electrolyte into the battery.

The moving mechanism is used to transfer the battery between the detection position, the adjustment position, and the liquid injection position to carry forward a subsequent position adjustment action or liquid injection action such that the liquid injection operation proceeds smoothly.

In some embodiments, the liquid injection apparatus further includes a liquid injection base, and at least part of the position adjustment mechanism and at least part of the liquid injection mechanism are disposed on opposite two sides of the liquid injection base, respectively.

The position adjustment mechanism and the liquid injection mechanism are both connected to the liquid injection base, which is conducive to structural compacting. Moreover, at least part of the position adjustment mechanism and at least part of the liquid injection mechanism are connected to the opposite two sides of the liquid injection base, respectively, such that the opposite two sides of the liquid injection base are loaded, which is beneficial to improving the stability of the liquid injection base.

In some embodiments, the position adjustment mechanism includes: a down-pressing pedestal, the down-pressing pedestal being mounted at one side of the liquid injection base; and a down-pressing structure, the down-pressing structure being provided at the down-pressing pedestal and capable of ascending or descending in relation to the down-pressing pedestal, and the down-pressing structure being capable of pressing the battery from top down in a descending process.

As such, the function of the down-pressing structure to press down the battery is achieved, such that the position of the battery can be adjusted, thereby improving the butting accuracy for the liquid injection port of the battery and the liquid injection mechanism.

In some embodiments, the liquid injection mechanism includes: a liquid injection mount, the liquid injection mount being mounted at the other side of the liquid injection base opposite to the down-pressing pedestal and capable of ascending or descending in relation to the liquid injection base; and a liquid injection unit, the liquid injection unit being mounted at the liquid injection mount, and the liquid injection unit being configured to be capable of injecting an electrolyte into the battery butted thereto; where in a process of the liquid injection mount descending, the liquid injection unit is capable of being brought to butt to the battery located at the set position.

As such, the function of butting the liquid injection mechanism to the battery and injecting an electrolyte into the battery is achieved. Furthermore, with the provision of the position adjustment mechanism, each battery may be located at each set position, thereby improving the accuracy of butting of the liquid injection unit to the battery.

In some embodiments, the down-pressing pedestal has a mounting space within, and the liquid injection mechanism further includes: a residual liquid receiving driving member, mounted within the mounting space of the down-pressing pedestal; and a residual liquid receiving box, connected to an output end of the residual liquid receiving driving member, the residual liquid receiving box being capable of moving between a residual liquid receiving position and a retracted position under the driving of the residual liquid receiving driving member, the residual liquid receiving box located at the residual liquid receiving position being located below a liquid outlet nozzle of the liquid injection unit and capable of butting to the liquid outlet nozzle of the liquid injection unit to receive a residual liquid flowing out of the liquid injection unit, and the residual liquid receiving box located at the retracted position being misaligned with the liquid outlet nozzle of the liquid injection unit in the vertical direction.

As such, collection of the residual liquid after the injection operation is achieved, reducing the impact on the ambient environment. Moreover, the residual liquid receiving driving member is mounted within the mounting space of the down-pressing pedestal, such that the residual liquid receiving driving member and the down-pressing structure are mounted together at the down-pressing pedestal, which is conducive to the structural compacting. Moreover, the mounting space of the down-pressing pedestal accommodates the residual liquid receiving driving member, which reduces space occupation and makes the structure more compact.

In some embodiments, the battery clamp includes an outer box and at least one partition plate provided within the outer box, and the partition plate partitions a space within the outer box into at least two battery accommodating grooves.

As such, the battery clamp is simple in structure, and the cost is low.

In some embodiments, the liquid injection device further includes: a nailing conveying mechanism, configured to convey a battery that has completed the liquid injection operation, and be capable of sequentially conveying the battery to a nail pre-pressing station and a nail full-pressing station; a nail pre-pressing mechanism, configured to pre-press a sealing nail into a liquid injection port of the battery located at the nail pre-pressing station; and a nail full-pressing mechanism, configured to press the sealing nail of the battery located at the nail full-pressing station such that the sealing nail is mounted in position.

As such, sealing of the liquid injection port of the battery is achieved, and the chances of battery leakage are reduced.

In some embodiments, the nailing conveying mechanism includes: a conveyor belt, configured to transmit power along a conveying direction; and at least two fixed blocks, sequentially provided along the conveying direction and connected to the conveyor belt, the adjacent fixed blocks being used to limit the opposite two sides of the battery, and a spacing of the adjacent fixed blocks being adjustable.

As such, a function of the nailing conveying mechanism to convey batteries to the nail pre-pressing station or the nail full-pressing station is achieved. Moreover, by varying the spacing of the adjacent fixed blocks, it is possible for use to limit batteries of different sizes, thereby improving compatibility.

In some embodiments, the conveyor belt includes a first conveyor belt and a second conveyor belt disposed side by side in a direction perpendicular to the conveying direction, adjacent two of the fixed blocks are, respectively, connected to the first conveyor belt and the second conveyor belt, the first conveyor belt and the second conveyor belt are configured to be capable of synchronously transmitting power along the conveying direction to convey batteries, and the first conveyor belt and the second conveyor belt are also configured to be capable of moving relatively along the conveying direction to regulate the spacing of the adjacent two of the fixed blocks.

As such, a function of regulating the spacing of the adjacent fixed blocks is achieved, enabling suitability for conveying batteries of different sizes and improving compatibility.

In some embodiments, the conveyor belt further includes a third conveyor belt, the third conveyor belt is disposed at a side of the second conveyor belt facing away from the first conveyor belt, the fixed blocks connected to the first conveyor belt are connected to the third conveyor belt, and the first conveyor belt and the third conveyor belt transmit power synchronously.

As such, the first conveyor belt, the second conveyor belt, and the third conveyor belt are disposed sequentially, the second conveyor belt is located at a middle position of the entirety of the conveyor belt, connecting to a middle part of the battery, and the first conveyor belt and the third conveyor belt are, respectively, connected to two edge portions of the battery. As such, the stability of connection of the fixed blocks may be improved, thereby improving the reliability of limitation for the battery.

In some embodiments, the nailing conveying mechanism further includes a first positioning assembly and a second positioning assembly, the first positioning assembly and the second positioning assembly are provided on opposite two sides of the conveyor belt, and the first positioning assembly and the second positioning assembly are configured to be capable of pushing the battery from two sides of the battery in a direction perpendicular to the conveying direction to limit the position of the battery.

As such, with the first positioning assembly and the second positioning assembly pushing the battery from two sides of the direction perpendicular to the conveying direction, it is possible to limit the battery in its four directions, the battery may be accurately positioned at the nail pre-pressing station and the nail full-pressing station, thereby increasing the smoothness level of sealing of the liquid injection port.

In some embodiments, the first positioning assembly includes a first pushing member, the first pushing member is provided with a limiting groove, the limiting groove includes a first pushing face facing the second positioning assembly and two limiting faces facing each other along the conveying direction, and the first pushing member is configured to be capable of moving toward the second positioning assembly such that the limiting groove is engaged to the battery.

As such, in a process of the first pushing member moving toward the second positioning assembly, the first pushing member gradually moves close to the battery until the limiting groove of the first pushing member is engaged to the battery, such that the first pushing face of the limiting groove is abutted against a surface of the battery, and the two limiting faces are limited to the opposite two sides of the battery along the conveying direction, thereby more reliably limiting the position of the battery.

In some embodiments, the second positioning assembly includes a clamping structure, the clamping structure includes a first clamping head and a second clamping head, and the first clamping head and the second clamping head are both provided with a clamping face and a second pushing face. The clamping faces of the first clamping head and the second clamping head face each other in the conveying direction, and the second pushing faces both face the first pushing member. The first clamping head and the second clamping head are configured to be capable of moving close to or far away from the first pushing member, and capable of moving close to or far away from each other in the conveying direction.

In a process of the first clamping head and the second clamping head moving close to the first pushing member, the first clamping head and the second clamping head gradually move close to the battery until the second pushing faces of the first clamping head and the second clamping head abut against the battery, and then the first clamping head and the second clamping head move close to each other until the clamping faces of the first clamping head and the second clamping head, respectively, clamp the opposite two surfaces of the battery, such that the battery is clamped by the clamping structure, which further improves the reliability of positioning for the battery.

In some embodiments, the nailing conveying mechanism is further capable of conveying the battery to a detection station located downstream of the nail full-pressing station, the liquid injection device further includes a sealing nail detection apparatus, and the sealing nail detection apparatus is configured to detect whether a sealing nail of the battery located at the detection station is mounted in position.

The sealing nail detection apparatus is provided to detect whether mounting of the sealing nail is qualified, so as to subsequently pick out batteries with unqualified sealing.

In some embodiments, the nailing conveying mechanism is further capable of conveying the battery to a cleaning station located downstream of the detection station, the liquid injection device further includes a cleaning mechanism, and the cleaning mechanism is configured to clean the liquid injection port of the battery located at the cleaning station.

The cleaning mechanism is provided to clean the liquid injection port, increasing cleanliness level of the battery.

In some embodiments, the liquid injection device further includes: an incoming material code-scanning apparatus, configured to be capable of scanning the battery; a preliminary weighing apparatus, located downstream of the incoming material code-scanning apparatus and upstream of the liquid injection apparatus, the preliminary weighing apparatus being configured to be capable of weighing the battery; and a subsequent weighing apparatus, located downstream of the liquid injection apparatus and upstream of the nailing conveying mechanism, the subsequent weighing apparatus being configured to weigh the battery that has completed the liquid injection operation.

By measuring weight of the battery before liquid injection and weight after liquid injection, it is possible to infer whether the weight of the battery before liquid injection is qualified and whether the weight of the battery after liquid injection is qualified, so as to screen out unqualified batteries.

In some embodiments, the liquid injection device further includes a defective incoming pull belt, the defective incoming pull belt being configured to be capable of receiving and conveying batteries that are unqualified in code scanning and batteries that are unqualified in weighing.

The defective incoming pull belt is used to output unqualified batteries.

In some embodiments, the liquid injection device further includes: a liquid injection loading-unloading manipulator, located downstream of the preliminary weighing apparatus, the liquid injection loading-unloading manipulator being configured to be capable of transferring batteries that are qualified in code scanning and qualified in weighing into the battery clamp of the liquid injection apparatus, and further capable of removing the batteries that have completed the liquid injection operation; a first transit apparatus, located downstream of the liquid injection apparatus and upstream of the subsequent weighing apparatus, and configured to receive the batteries transferred by the liquid injection loading-unloading manipulator and convey them to the subsequent weighing apparatus; a second transit apparatus, located downstream of the subsequent weighing apparatus and upstream of the nailing conveying mechanism, and configured to receive and convey the batteries from the subsequent weighing apparatus; and a nailing transit manipulator, located downstream of the second transit apparatus and upstream of the nailing conveying mechanism, and configured to be capable of transferring the batteries on the second transit apparatus to the nailing conveying mechanism.

As such, the transit or transfer of batteries between adjacent apparatuses is achieved.

A second aspect of the present disclosure provides a battery production line, the battery production line including: a battery casing apparatus, configured to load a bare battery cell into a case to form a battery; and the above-mentioned liquid injection device, the liquid injection device being disposed downstream of the battery casing apparatus.

Since the battery production line includes the liquid injection device, the battery production line having all the beneficial effects of the liquid injection device, the battery production line can improve the accuracy of butting at battery liquid injection, thereby improving the yield of batteries.

A third aspect of the present disclosure provides a liquid injection method using a liquid injection device, the liquid injection device includes a liquid injection apparatus, the liquid injection apparatus includes a battery clamp, a position adjustment mechanism, and a liquid injection mechanism, the battery clamp is provided with at least one battery accommodating groove, and the battery accommodating groove has a set position within, an upper portion of the battery accommodating groove is provided with an access groove mouth, and the position adjustment mechanism is configured to be capable of pressing a battery from top down such that the battery moves to the set position within the battery accommodating groove;

the liquid injection method includes:
a putting step, where the battery is put in the battery accommodating groove of the battery clamp;
a position adjustment step, where the position adjustment mechanism adjusts the battery that has been put in the battery accommodating groove and is not located at the set position to the set position;
and a liquid injection step, where the liquid injection mechanism butts to a liquid injection port of the battery located at the set position and injects an electrolyte into the battery.

When liquid injection is performed on the battery using the liquid injection method provided by the embodiments of the present disclosure, the battery is first put in the battery accommodating groove of the battery clamp. For the battery that is not located at the set position, position adjustment is performed with the position adjustment mechanism such that the battery moves to the set position. Since the position of the battery is corrected, the liquid injection mechanism can be accurately butted to the liquid injection port of the battery, thereby enabling improvement in the accuracy of butting of the liquid injection mechanism to the liquid injection port of the battery.

The access groove mouth is provided in the upper portion of the battery accommodating groove, such that a putting-in direction for the battery is from top down, that is, the battery needs to be mounted within the battery accommodating groove from top down. In this case, after the battery is put through the access groove mouth from top down, the battery may be released. The battery automatically moves down under the action of gravity and continues to enter the battery accommodating groove. A pushing action of continuing to push the battery in may be omitted, which is conducive to improving the efficiency of operation. In the case that the battery is stuck and cannot continue to move down, resulting in inability to move to the set position, the battery may be pushed to the set position by means of the position adjustment mechanism pressing the battery from top down, thereby enabling regulation of the battery position. Such regulation means is simple in action and has high regulation efficiency.

In some embodiments, the liquid injection apparatus further includes a detection apparatus; the liquid injection method further includes, after the putting step:
a detection step, where the detection apparatus detects whether the battery that has been put in each of the battery accommodating grooves is located at each of the set positions,
if it is detected that at least one battery is not located at the set position, the method proceeds to the position adjustment step, and if it is detected that each of the batteries is located at each of the set positions, the method proceeds to the liquid injection step.

Through the detection by the detection apparatus, it is possible to judge whether the battery put in the battery clamp needs to be subjected to position adjustment. The position adjustment mechanism is used when needed, and the position adjustment mechanism may not be used when not needed. As such, automatic detection is achieved, the accuracy and efficiency of detection are improved, and some useless operations by the position adjustment mechanism may further be omitted, improving the operational efficiency of battery liquid injection.

In some embodiments, the upper portion of the battery accommodating groove is provided with an access groove mouth;
in the position adjustment step, the position adjustment mechanism presses the battery from top down, such that the battery that is not located at the set position is moved to the set position.

The access groove mouth is provided in the upper portion of the battery accommodating groove, such that a putting-in direction for the battery is from top down, that is, the battery needs to be mounted within the battery accommodating groove from top down. In this case, after the battery is put through the access groove mouth from top down, the battery may be released. The battery automatically moves down under the action of gravity and continues to enter the battery accommodating groove. A pushing action of continuing to push the battery in may be omitted, which is conducive to improving the efficiency of operation.

In some embodiments, the liquid injection apparatus further includes a moving mechanism, and the battery clamp is provided at the moving mechanism, and capable of moving between a detection position, an adjustment position, and a liquid injection position under the action of the moving mechanism;

the position adjustment step includes:
a step of arrival to adjustment position, where the moving mechanism moves the battery clamp from the detection position to the adjustment position;
and an adjustment execution step, where the position adjustment mechanism adjusts the battery that is not located at the set position to the set position;

the liquid injection step includes:
a step of arrival to liquid injection position, where the moving mechanism moves the battery clamp to the liquid injection position;
and a liquid injection execution step, where the liquid injection mechanism butts to the liquid injection port of the battery and injects the electrolyte into the battery.

The moving mechanism is used to transfer the battery between the detection position, the adjustment position, and the liquid injection position to carry forward the subsequent adjustment execution step or liquid injection execution step such that the liquid injection operation proceeds smoothly.

In some embodiments, the liquid injection device further includes a nailing conveying mechanism, a nail pre-pressing mechanism, and a nail full-pressing mechanism;

the liquid injection method further includes, after the liquid injection step:
a step of arrival to pre-pressing position, where the nailing conveying mechanism conveys the battery that has completed the liquid injection step to the nail pre-pressing station;
a nail pre-pressing step, where the nail pre-pressing mechanism presses a sealing nail into a liquid injection port of the battery located at the nail pre-pressing station;
a step of arrival to full-pressing position, where the nailing conveying mechanism conveys the battery that has completed the nail pre-pressing step to the nail full-pressing station;
and a nail full-pressing step, where the nail full-pressing mechanism presses the sealing nail of the battery located at the nail full-pressing station such that the sealing nail is mounted in position.

The nailing conveying mechanism first conveys the battery that has completed the liquid injection step to the nail pre-pressing station, and the nail pre-pressing mechanism presses the sealing nail into the liquid injection port of the battery that has been conveyed to the nail pre-pressing station. Then, the nailing conveying mechanism conveys the battery with the sealing nail pressed therein to the nail full-pressing station, and the nail full-pressing mechanism presses the sealing nail located in the battery that has been conveyed to the nail full-pressing station, such that the sealing nail is mounted in position, thereby completing sealing of the liquid injection port. As such, the sealing of the liquid injection port of the battery is achieved, and the chances of battery leakage are reduced.

In some embodiments, the liquid injection device further includes a sealing nail detection apparatus and a cleaning mechanism;

the liquid injection method further includes, after the nail full-pressing step:
a step of arrival to sealing detection position, where the nailing conveying mechanism conveys the battery that has completed the nail full-pressing step to a sealing detection station;
a sealing nail detection step, where the sealing nail detection apparatus detects whether the sealing nail of the battery located at the sealing detection station is mounted in position;
a step of arrival to cleaning position, where the nailing conveying mechanism conveys the battery that has completed the sealing nail detection step to a cleaning station;
and a cleaning step, where the cleaning mechanism cleans the liquid injection port of the battery located at the cleaning station.

As such, by detecting whether mounting of the sealing nail is qualified, it is convenient to subsequently pick out unqualified products. By cleaning the liquid injection port, the cleanliness level of the battery is increased.

In some embodiments, the liquid injection device further includes an incoming material code-scanning apparatus, a preliminary weighing apparatus, and a subsequent weighing apparatus; the liquid injection method further includes, before the putting step:
an incoming material code-scanning step, where the incoming material code-scanning apparatus receives a battery and scans a code for the battery;
and a preliminary weighing step, where the preliminary weighing apparatus receives the battery that has completed the incoming material code-scanning step and weighs the battery;

the liquid injection method further includes, between the liquid injection step and the step of arrival to pre-pressing position:
a subsequent weighing step, where the subsequent weighing apparatus receives the battery that has completed the liquid injection step and weighs the battery.

By measuring weight of the battery before liquid injection and weight after liquid injection, it is possible to infer whether the weight of the battery before liquid injection is qualified and whether the weight of the battery after liquid injection is qualified, so as to screen out unqualified batteries.

Effects of the Disclosure

Through the present disclosure, there is provided a liquid injection device, a battery production line, and a liquid injection method, which can improve the accuracy of butting to a liquid injection port of a battery.

DESCRIPTION OF DRAWINGS

By reading the detailed description of the preferred implementations below, various other advantages and benefits will become apparent to those of ordinary skill in the art. The drawings are for the purpose of illustrating the preferred implementations only and are not to be considered a limitation to the present disclosure. Moreover, in all of the drawings, the same components are indicated by the same reference numerals. In the drawings.

Figure 1:
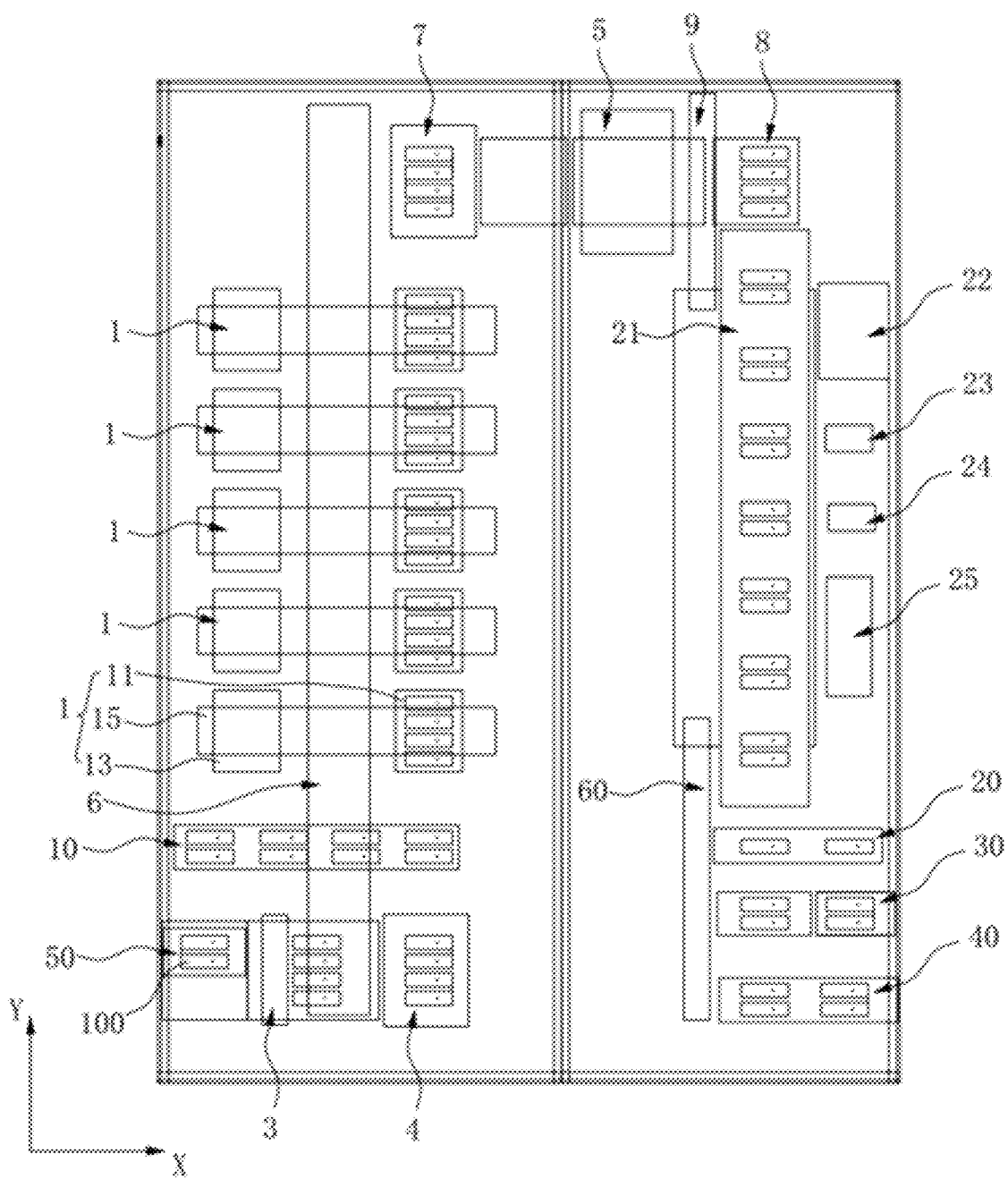
FIG. 1 is a top view of a liquid injection device according to some embodiments of the present disclosure.

DESCRIPTION OF REFERENCE NUMERALS 100, battery; 1000, battery casing apparatus; 1, liquid injection apparatus; 11, battery clamp; 111, access groove mouth; 112, outer box; 113, partition plate; 114, jacking opening; 12, position adjustment mechanism; 121, down-pressing pedestal; 122, down-pressing structure; 1221, presser head mounting member; 1222, presser head; 123, down-pressing driving member; 13, liquid injection mechanism; 131, liquid injection mount; 132, liquid injection unit; 1321, liquid inlet main pipe; 1322, incoming liquid pipe; 1323, negative pressure air pipe; 1324, liquid injection cup; 13241, cup body; 13242, first end cover; 13243, second end cover; 1325, liquid outlet nozzle; 1326, evacuating valve; 1327, incoming liquid valve; 1328, liquid injection valve; 133, butting driving member; 134, residual liquid receiving box; 135, air outlet pipe; 136, liquid outlet pipe; 137, residual liquid receiving driving member; 14, detection apparatus; 15, moving mechanism; 151, moving carrier; 152, sliding guide rail; 153, sliding carrier plate; 16, liquid injection base; 17, jacking mechanism; 171, ejector rod; 172, ejector rod mounting bracket; 173, jacking driving member; 21, nailing conveying mechanism; 211, conveyor belt; 2111, first conveyor belt; 2112, second conveyor belt; 2113, third conveyor belt; 212, first positioning assembly; 2121, first pushing member; 2122, limiting groove; 2123, first pushing face; 2124, limiting face; 2125, first pushing driving member; 213, second positioning assembly; 2131, clamping structure; 2132, first clamping head; 2133, second clamping head; 2134, clamping face; 2135, second pushing face; 2136, clamping holder; 2137, second pushing driving member; 214, fixed block; 22, nail pre-pressing mechanism; 23, nail full-pressing mechanism; 24, sealing nail detection apparatus; 241, CCD visual detection apparatus; 25, cleaning mechanism; 251, cleaning liquid dripping mechanism; 252, cleaning cloth cutting mechanism; 253, wiping mechanism; 2531, rotary driving member; 2532, wiping head; 2533, wiping mounting bracket; 254, lifting driving mechanism; 3, incoming material code-scanning apparatus; 31, code-scanning conveying mechanism; 32, code-scanning stopping mechanism; 321, stopping mounting bracket; 322, stopping driving member; 323, stopping member; 33 first code scanner; 4, preliminary weighing apparatus; 41, preliminary conveying mechanism; 411, conveying roller; 412, roller mounting bracket; 413, roller lifting driving member; 42, preliminary stopping mechanism; 43 preliminary weighing mechanism; 431, weighing sensor; 5, subsequent weighing apparatus; 51, subsequent conveying mechanism; 52, subsequent stopping mechanism; 53, subsequent weighing mechanism; 54, second code scanner; 6, liquid injection loading-unloading manipulator; 61, loading-unloading mounting bracket; 62, loading shifting driving module; 63, loading lifting driving module; 64, loading gripper; 65, unloading shifting driving module; 66, unloading lifting driving module; 67, unloading gripper; 7, first transit apparatus; 8, second transit apparatus; 9, nailing transit manipulator; 91, transit mounting bracket; 92, transit shifting driving module; 93, transit lifting driving module, 94, transit gripper; 10, defective incoming pull belt; 20, unloading-buffering-mating pull belt; 30, unloading pull belt; 40, defective unloading pull belt; 50 incoming material spacing-varying pull belt; 60, unloading manipulator.

DETAILED DESCRIPTION

Examples of the technical solutions of the present disclosure will be described in detail below in conjunction with the drawings. The following embodiments are only used to illustrate the technical solutions of the present disclosure more clearly, and are therefore used only as examples, and should not be used to limit the protection scope of the present disclosure.

Unless otherwise defined, all technical and scientific terms used herein have the same meaning as commonly understood by those skilled in the art belonging to the technical field of the present disclosure; the terms used herein are intended only for the purpose of describing specific embodiments and are not intended to limit the present disclosure; the terms "including" and "having" and any variations thereof in the specification of the present disclosure and in the description of drawings above are intended to cover non-exclusive inclusion.

In the description of the embodiments of the present disclosure, the technical terms "first", "second", "third", and the like are used only to distinguish between different objects, and are not to be understood as indicating or implying a relative importance or implicitly specifying the number, particular order, or primary and secondary relation of the technical features indicated. In the description of the embodiments of the present disclosure, "a plurality of" means two or more, unless otherwise explicitly and specifically defined.

The reference to "embodiments" herein means that specific features, structures or characteristics described in combination with the embodiments may be included in at least one embodiment of the present disclosure. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present disclosure, the term "and/or" is only an association relationship for describing associated objects, indicating that three relationships may exist. For example, A and/or B may indicate three situations: A exists alone, both A and B exist, and B exists alone. In addition, the character "/" herein generally indicates an "or" relationship between the associated objects.

In the description of the embodiments of the present disclosure, the technical terms "length," "width," "thickness," "upper," "lower," "front," "rear," "left," "right," "vertical," "horizontal," "top," "bottom," "inner," "outer," "circumferential," and the like indicate orientations or positional relationships based on the orientations or positional relationships shown in the drawings, and are intended only to facilitate and simplify the description of the embodiments of the present disclosure, and are not intended to indicate or imply that a device or element referred to must have a particular orientation, be constructed, operated and used in a particular orientation, and therefore should not be construed as limiting the embodiments of the present disclosure.

In the description of the embodiments of the present disclosure, unless otherwise expressly specified and defined, the technical terms "mounted," "linked," "connected," "fixed," and the like are to be understood broadly, and may, for example, be fixedly connected or detachably connected, or integrated; and may also be mechanically connected or electrically connected; and may be directly linked or indirectly linked through an intermediate medium, and may be internal communication or interaction between two elements. For those of ordinary skill in the art, the specific meanings of the above terms in the embodiments of the present disclosure can be understood according to specific situations.

In the description of the embodiments of the present disclosure, unless otherwise expressly specified and defined, the technical term "contact" shall be understood in a broad sense, either as direct contact, as contact across an intermediate medium layer, as contact between the two in contact that is substantially free of interaction force, or as contact with interaction force between the two in contact.

In the following, the present disclosure will be described in detail.

At present, new energy batteries are increasingly used in daily life and industry. The new energy batteries are not only applied in energy storage power supply systems such as water power, fire power, wind power, and solar power stations, but also widely applied in electric transportation tools, such as electric bicycles, electric motorcycles and electric vehicles, as well as many fields, such as aerospace. With the continuous expansion of the application field of the power batteries, the market demand is also constantly expanding.

In an embodiment of the present disclosure, a battery may be a battery cell.

The battery cell may be a secondary battery, and the secondary battery refers to a battery cell that may be used continually by activating an active material by means of charging after the battery cell is discharged.

The battery cell may be a lithium-ion battery, a sodium-ion battery, a sodium/lithium-ion battery, a lithium metal battery, a sodium metal battery, a lithium-sulfur battery, a magnesium-ion battery, a nickel-hydrogen battery, a nickel-cadmium battery, a lead storage battery, or the like, which is not limited in the embodiments of the present disclosure.

The battery cell includes a bare battery cell (also referred to as electrode assembly). The bare battery cell includes a positive electrode plate, a negative electrode plate, and a spacer. In a charging/discharging process of the battery cell, active ions (e.g. lithium ions) are intercalated and de-intercalated back and forth between the positive electrode plate and the negative electrode plate. The spacer is disposed between the positive electrode plate and the negative electrode plate, and may function to prevent short circuit between a positive electrode and a negative electrode, while allowing active ions to pass through.

In some embodiments, the battery cell may include a case. The case is used to encapsulate components, such as the bare battery cell and an electrolyte. The case may be a steel case, an aluminum case, a plastic case (like polypropylene), a composite metal case (like a copper-aluminum composite case), an aluminum-plastic film, or the like.

As an example, the battery cell may be a cylindrical battery cell, a prismatic battery cell, a pouch cell, or a battery cell in another shape. The prismatic battery cell includes a square-case battery cell, a blade battery cell, and a polygonal-prism battery. The polygonal-prism battery is, for example, a hexagonal-prism battery, or the like, which is not particularly limited in the present disclosure.

In some embodiments, the bare battery cell is of a wound structure. The positive electrode plate, the negative electrode plate, and the separator are wound into a wound structure.

In some embodiments, the bare battery cell is of a stacked structure.

In a production process of the battery cell (referred to as battery hereinafter), there is a liquid injection procedure after the bare battery cell is put in a case. First, a liquid outlet nozzle of a liquid injection device is butted to a liquid injection port of a battery, and then an electrolyte is injected into the battery through the liquid outlet nozzle. The inventors of the present disclosure have noticed that usually a battery is placed within a battery clamp, a liquid outlet nozzle and a liquid injection port of the battery within the battery clamp are brought to face each other by moving the battery clamp to a predetermined position, and then butting of the liquid outlet nozzle and the liquid injection port of the battery is achieved by bringing the liquid outlet nozzle and the battery clamp close to each other. However, when the position of the battery placed within the battery clamp is inaccurate, butting accuracy for the liquid outlet nozzle and the liquid injection port of the battery is easily influenced. Inaccurate butting affects smooth progress of a subsequent liquid injection action and also causes damage to the liquid outlet nozzle or a case of the battery. Therefore, how to improve the accuracy of butting of the liquid outlet nozzle of the liquid injection device to the liquid injection port of the battery is one of the topics that the industry need to study.

After research, the inventors of the present disclosure have found that by adding a position adjustment mechanism for adjusting a position of the battery in the battery clamp into the liquid injection device, the battery that is not located at a set position may be adjusted to the set position, thereby improving the accuracy of the butting of the liquid outlet nozzle to the liquid injection port, thus allowing the subsequent liquid injection action to progress smoothly, and reducing the chances of damage to the liquid outlet nozzle or the battery case.

Based on such a design concept, the inventors of the present disclosure design a liquid injection device, the liquid injection device including a battery clamp, a position adjustment mechanism, and a liquid injection mechanism. The battery clamp is provided with at least one battery accommodating groove, and the battery accommodating groove has a set position therein; the position adjustment mechanism is configured to be capable of adjusting a battery that has been put in the battery accommodating groove and not located at the set position to the set position; the liquid injection mechanism is configured to be capable of butting to the liquid injection port of the battery located at the set position, and performing a liquid injection operation of injecting an electrolyte into the battery.

When liquid injection is performed on the battery with the liquid injection device provided by the present disclosure, the battery is put in the battery accommodating groove of the battery clamp. For the battery that is not located at the set position, position adjustment is performed with the position adjustment mechanism such that the battery moves to the set position. Since the position of the battery is corrected, the liquid injection mechanism can be accurately butted to the liquid injection port of the battery, thereby enabling improvement in the accuracy of butting of the liquid outlet nozzle to the liquid injection port.

The liquid injection device of the embodiments of the present disclosure may be used in a liquid injection procedure of the battery, including but not limited to a first liquid injection after a bare battery cell is put in the case and a second liquid injection after formation.

Some embodiments of the present disclosure are detailed below with reference to FIGS. 1 to 33.

Figure 2:
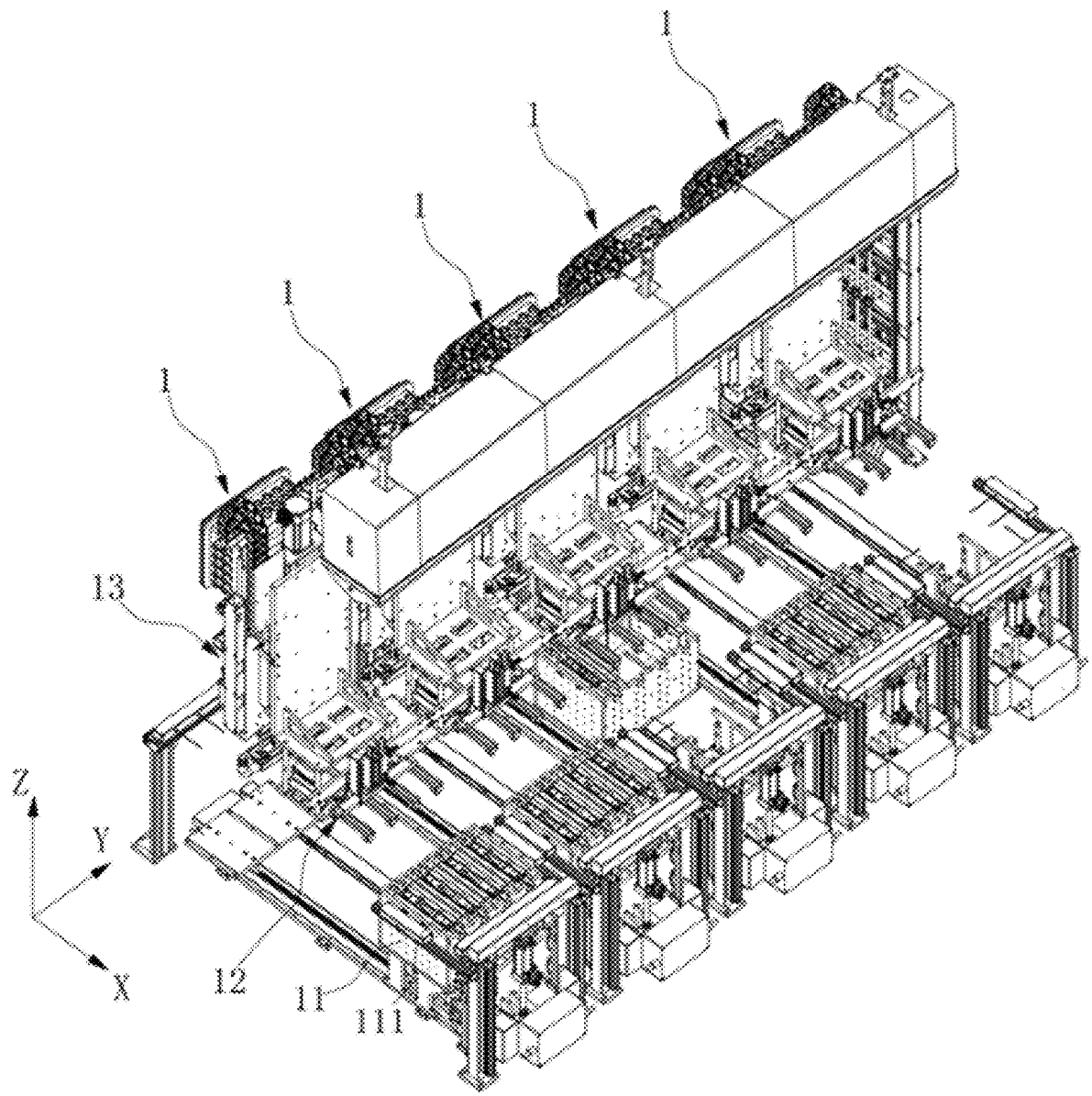
FIG. 2 is a stereoscopic structural schematic diagram of a plurality of liquid injection apparatuses according to some embodiments of the present disclosure from a first perspective.
Figure 3:
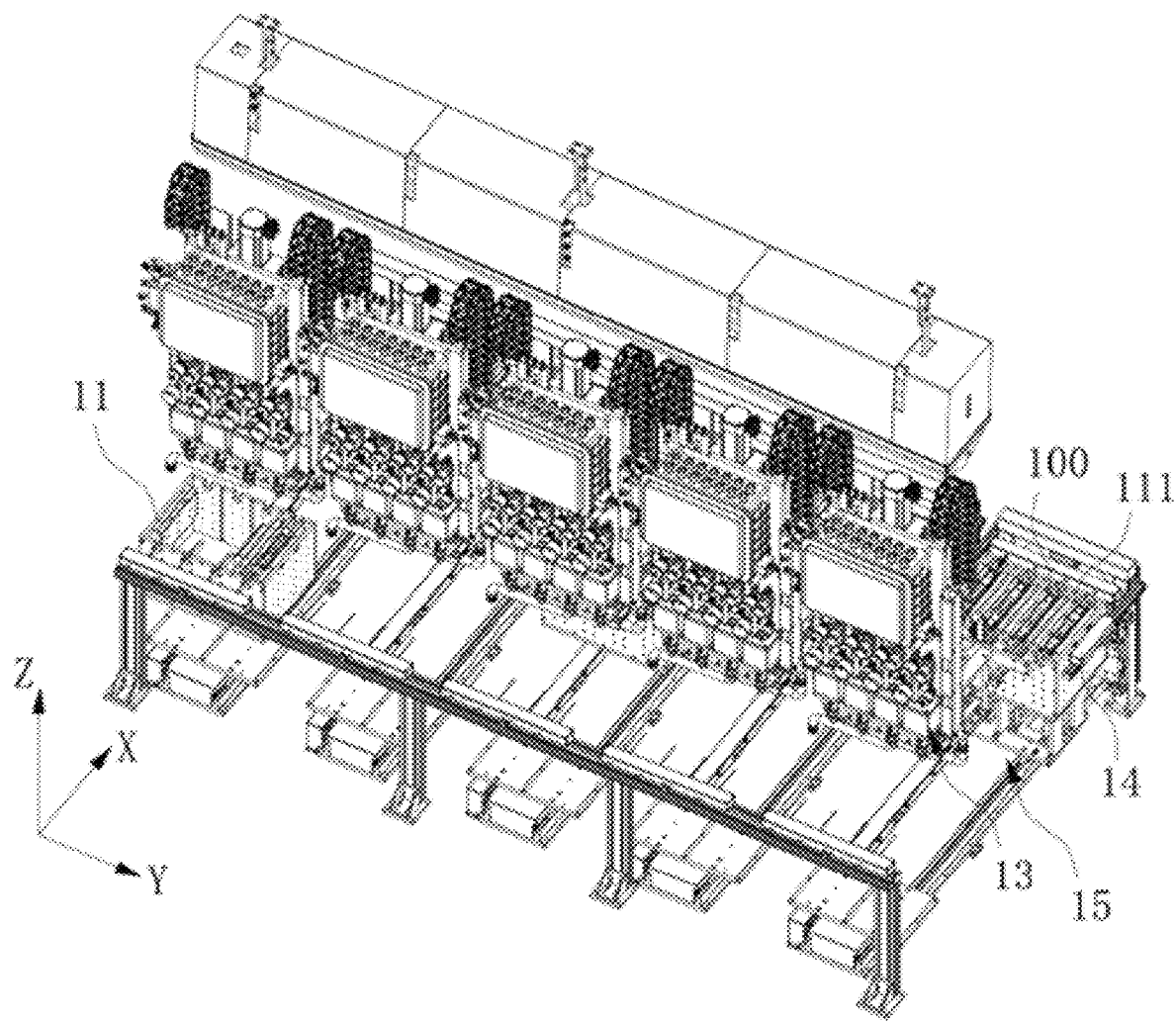
FIG. 3 is a stereoscopic structural schematic diagram of a plurality of liquid injection apparatuses according to some embodiments of the present disclosure from a second perspective.
Figure 4:
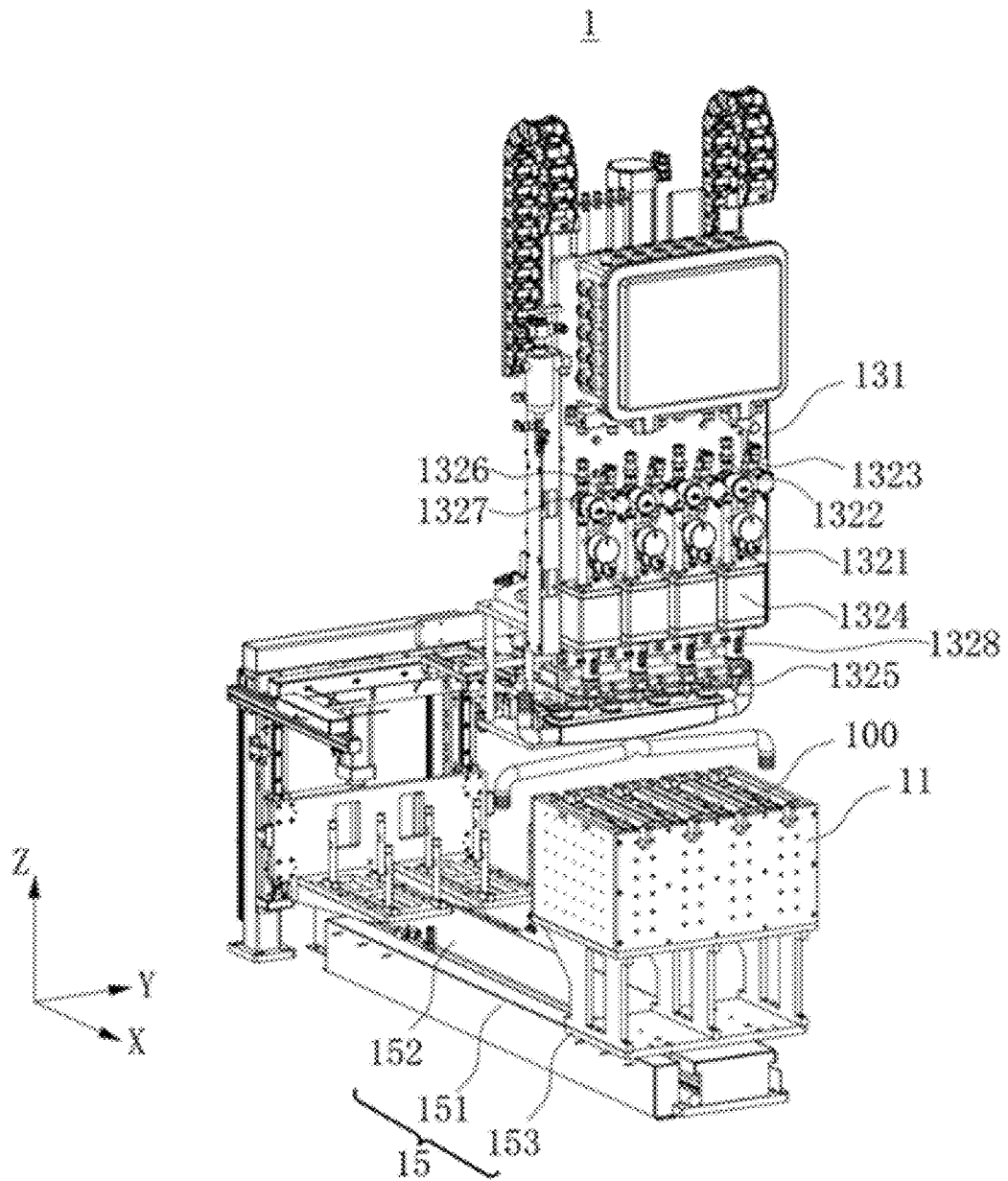
FIG. 4 is a stereoscopic structural schematic diagram of a liquid injection apparatus according to some embodiments of the present disclosure from a first perspective.
Figure 5:
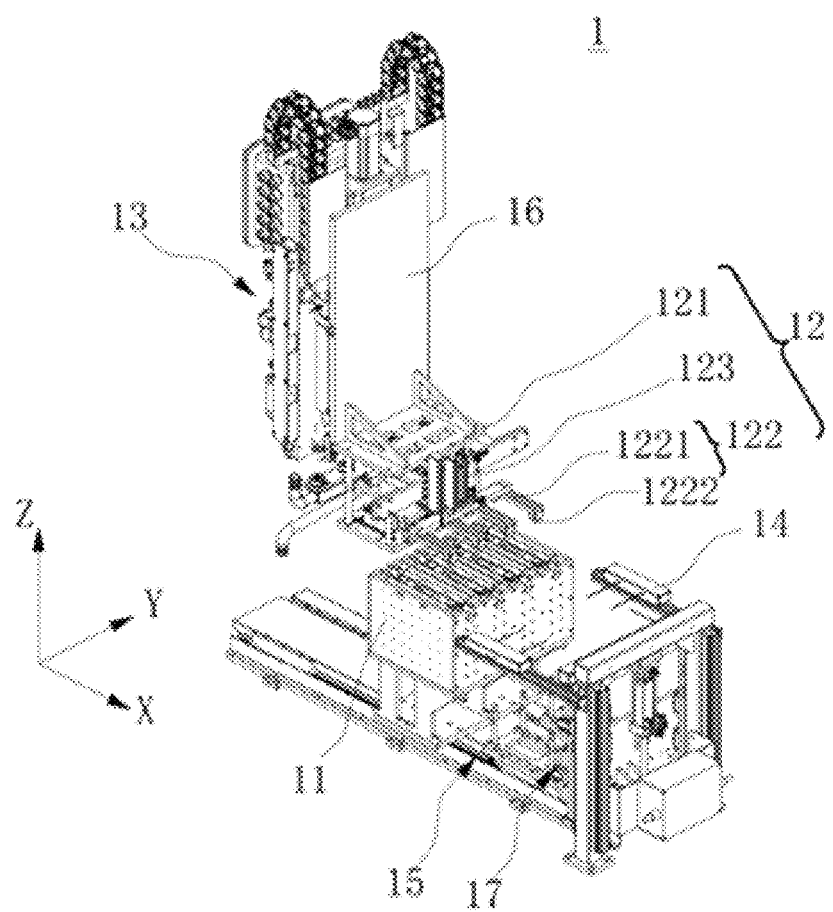
FIG. 5 is a stereoscopic structural schematic diagram of a liquid injection apparatus according to some embodiments of the present disclosure from a second perspective.
Figure 6:
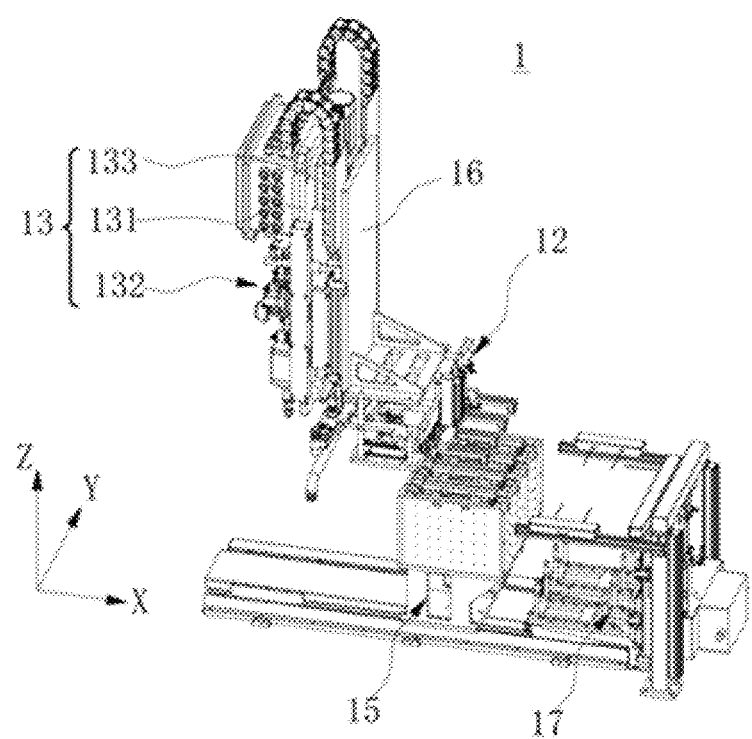
FIG. 6 is a stereoscopic structural schematic diagram of a liquid injection apparatus according to some embodiments of the present disclosure from a third perspective.
Figure 7:
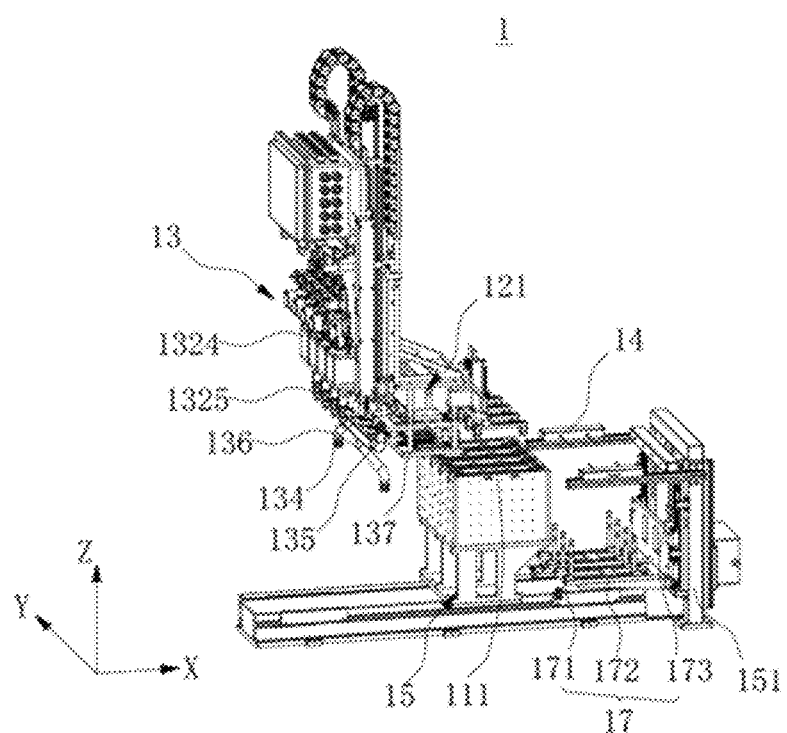
FIG. 7 is a stereoscopic structural schematic diagram of a liquid injection apparatus according to some embodiments of the present disclosure from a fourth perspective.
Figure 8:
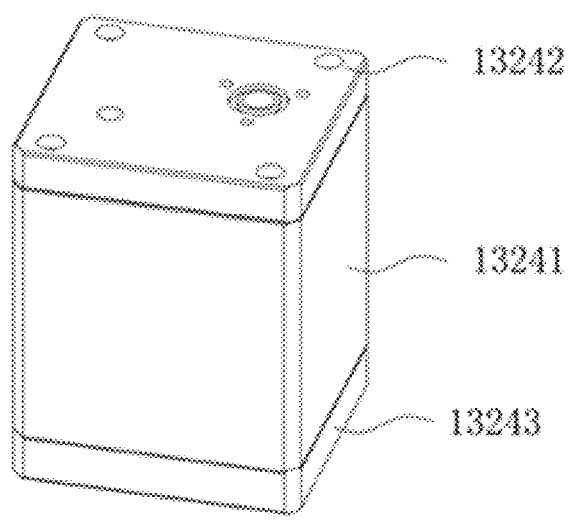
FIG. 8 is a stereoscopic structural schematic diagram of a liquid injection cup according to some embodiments of the present disclosure.
Figure 9:
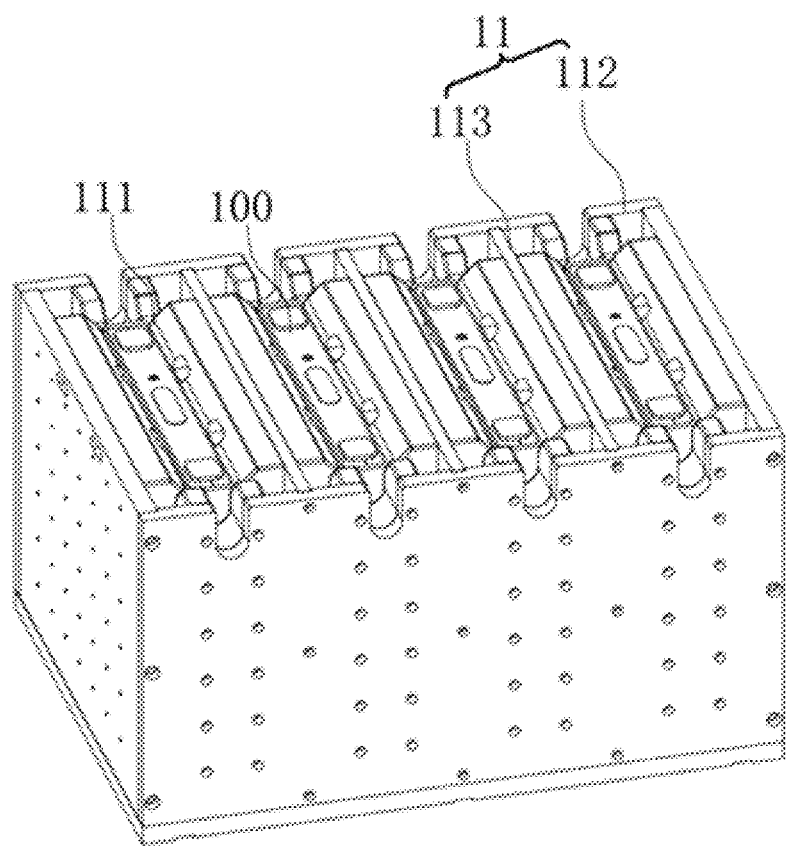
FIG. 9 is a stereoscopic structural schematic diagram of a battery clamp according to some embodiments of the present disclosure from a first perspective.
Figure 10:
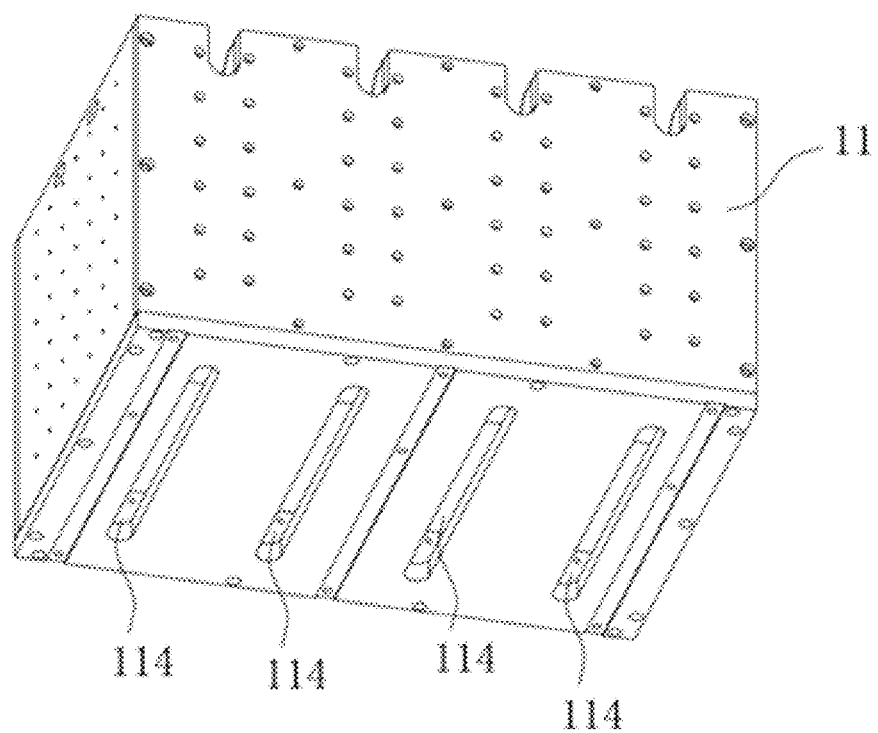
FIG. 10 is a stereoscopic structural schematic diagram of a battery clamp according to some embodiments of the present disclosure from a second perspective.
Figure 11:
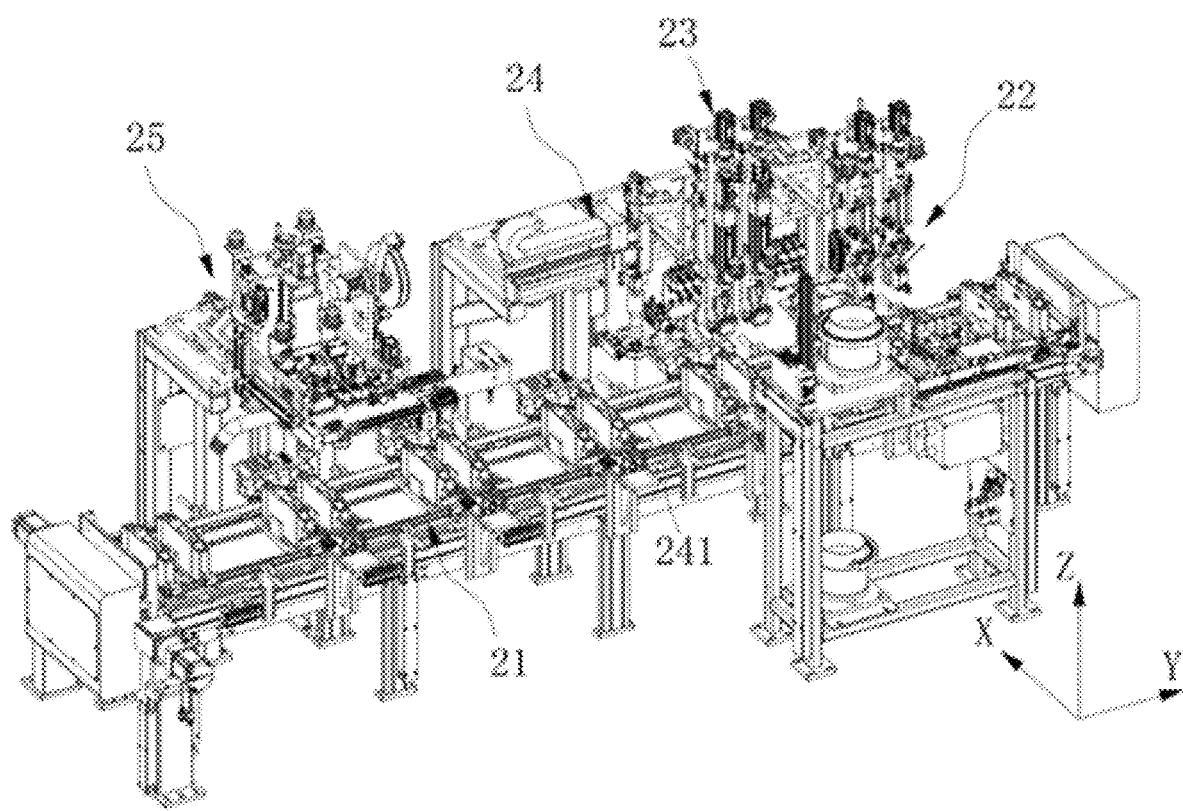
FIG. 11 is a stereoscopic structural schematic diagram of a nail pre-pressing mechanism, a nail full-pressing mechanism, a sealing nail detection apparatus, a cleaning mechanism, and a nailing conveying mechanism according to some embodiments of the present disclosure.
Figure 12:
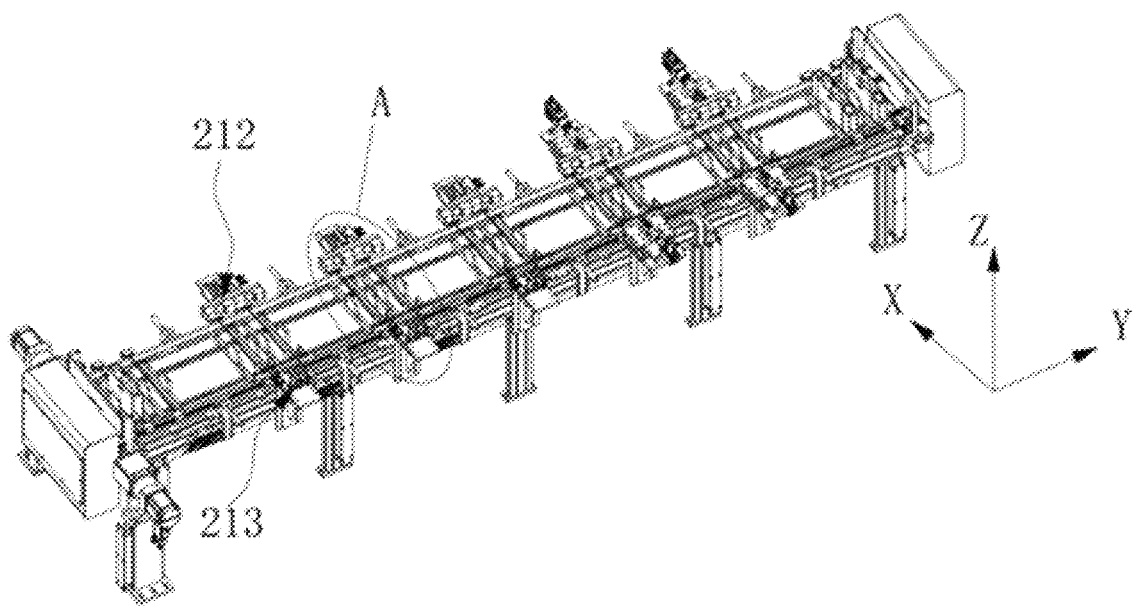
FIG. 12 is a stereoscopic structural schematic diagram of a nailing conveying mechanism according to some embodiments of the present disclosure.
Figure 13:
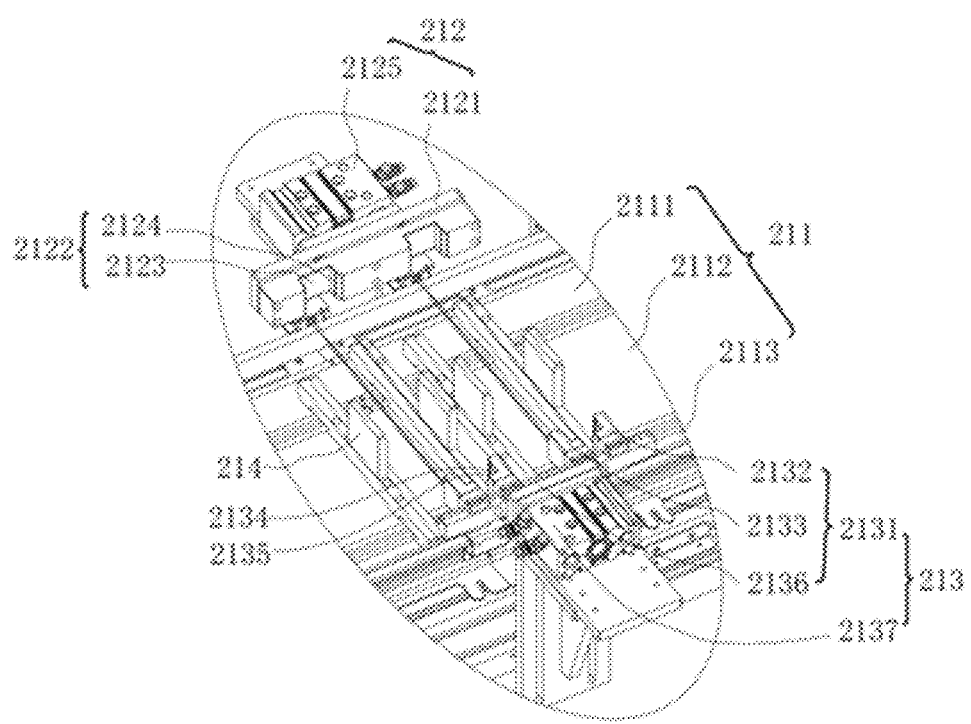
FIG. 13 is an enlarged view of position A in FIG. 12.
Figure 14:
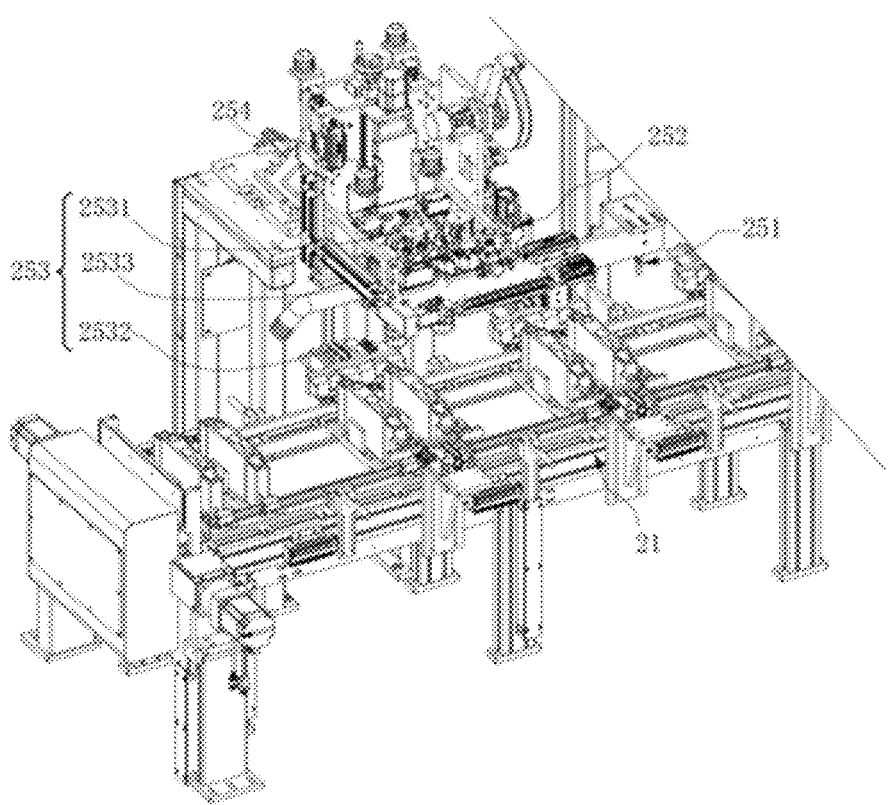
FIG. 14 is a stereoscopic structural schematic diagram of a cleaning mechanism and part of a nailing conveying mechanism according to some embodiments of the present disclosure.
Figure 15:
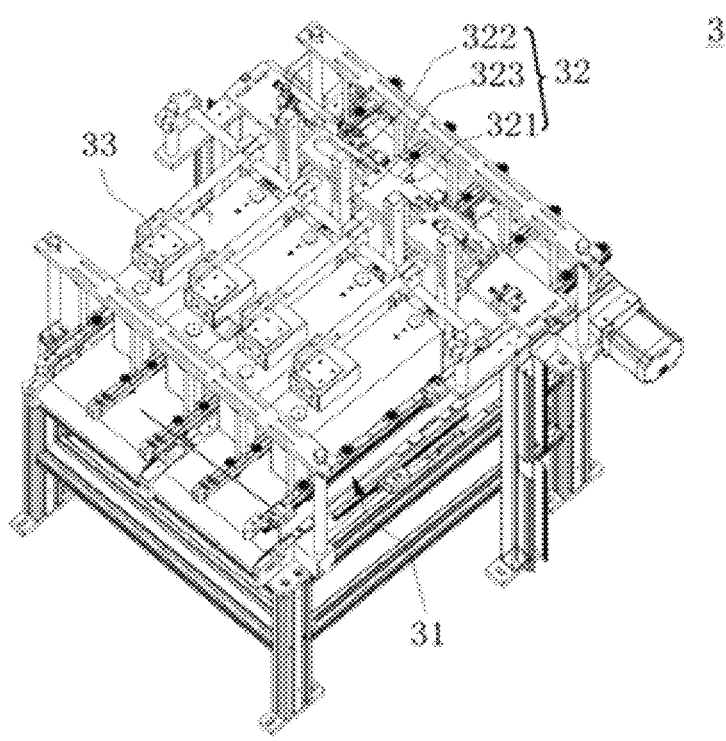
FIG. 15 is a stereoscopic structural schematic diagram of an incoming material code-scanning apparatus according to some embodiments of the present disclosure.
Figure 16:
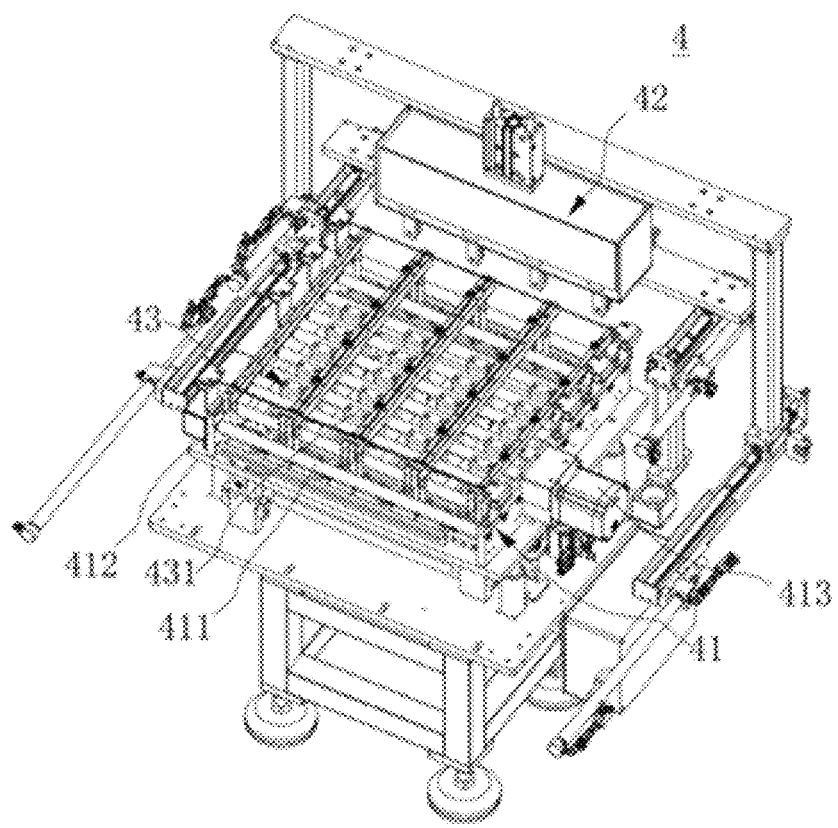
FIG. 16 is a stereoscopic structural schematic diagram of a preliminary weighing apparatus according to some embodiments of the present disclosure.
Figure 17:
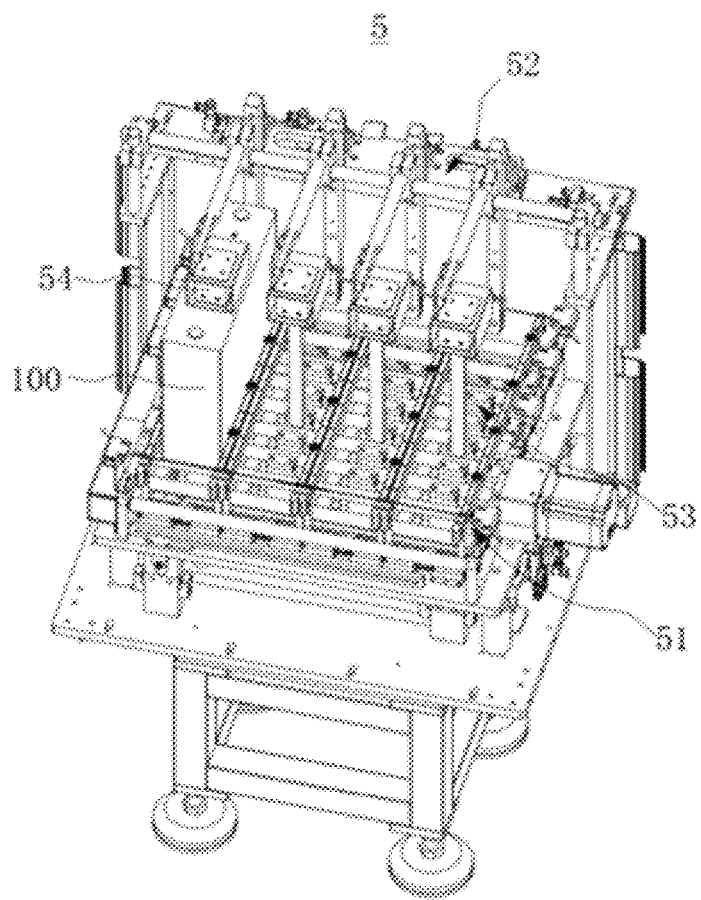
FIG. 17 is a stereoscopic structural schematic diagram of a subsequent weighing apparatus according to some embodiments of the present disclosure.
Figure 18:
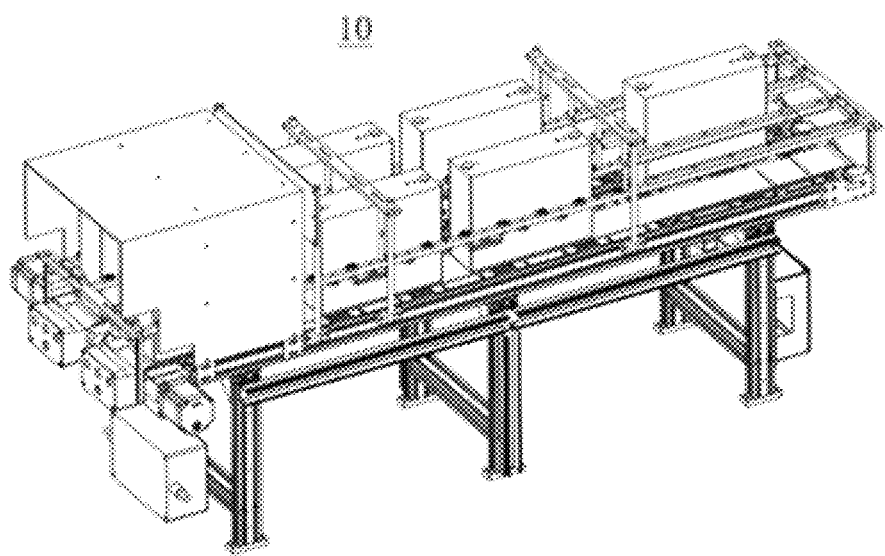
FIG. 18 is a stereoscopic structural schematic diagram of a defective incoming pull belt according to some embodiments of the present disclosure.
Figure 19:
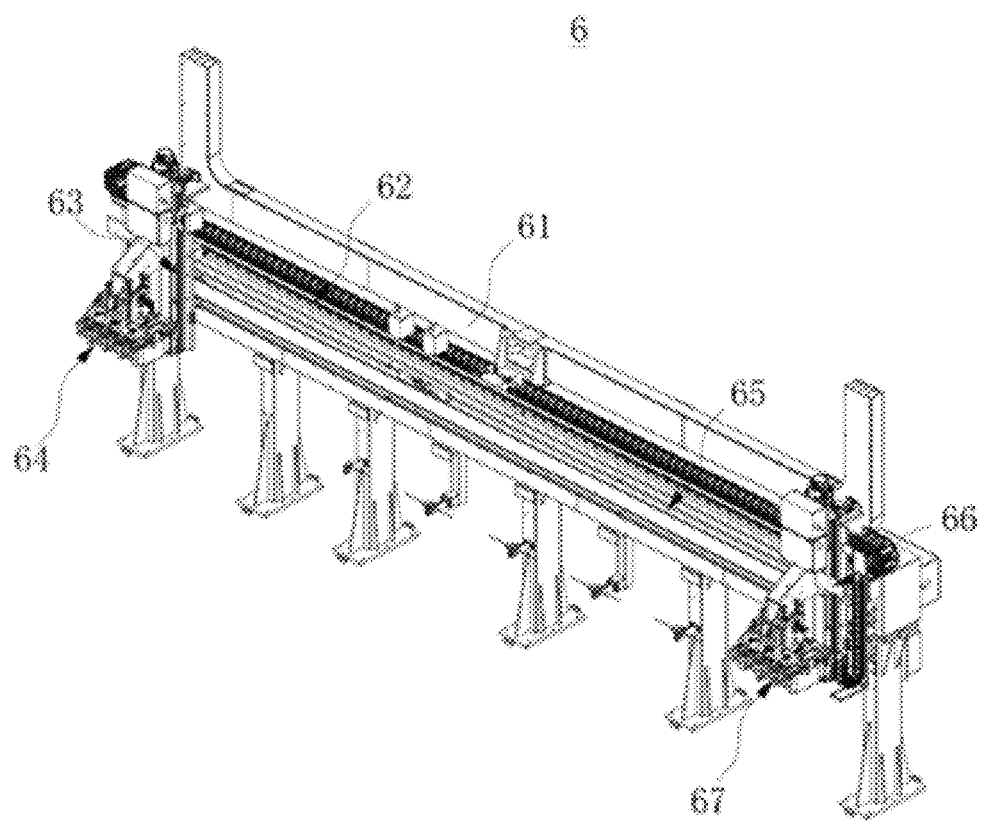
FIG. 19 is a stereoscopic structural schematic diagram of a liquid injection loading-unloading manipulator according to some embodiments of the present disclosure.
Figure 20:
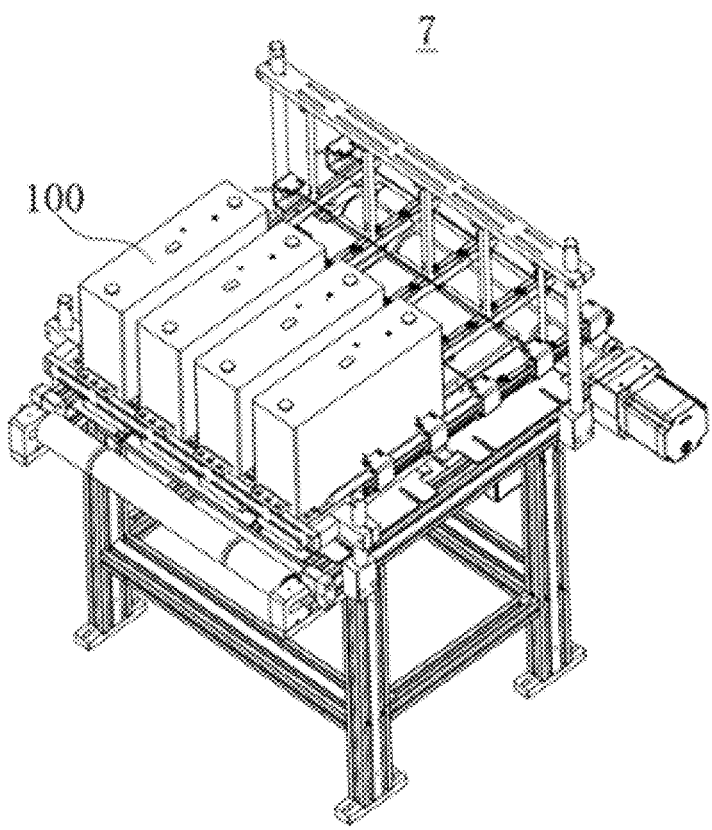
FIG. 20 is a stereoscopic structural schematic diagram of a first transit apparatus according to some embodiments of the present disclosure.
Figure 21:
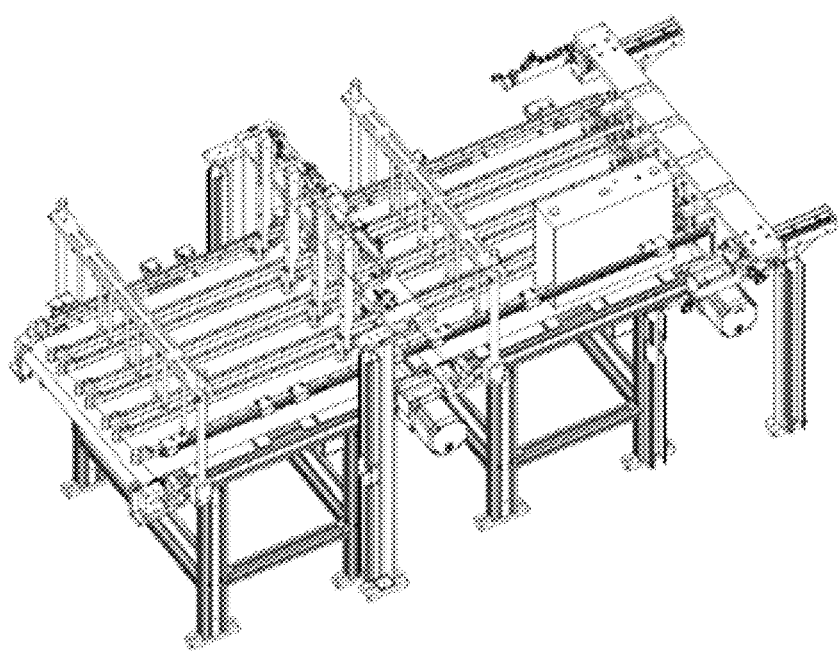
FIG. 21 is a stereoscopic structural schematic diagram of a second transit apparatus according to some embodiments of the present disclosure.
Figure 22:
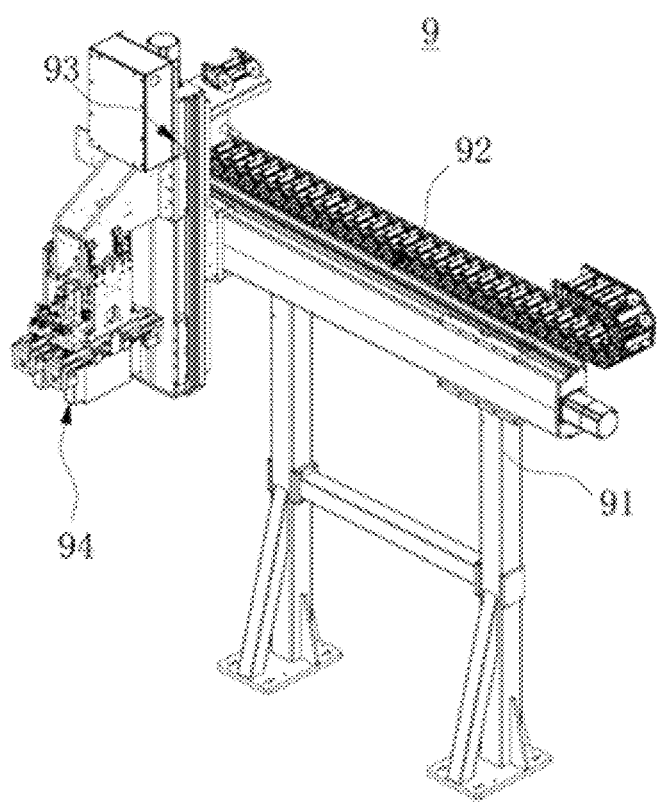
FIG. 22 is a stereoscopic structural schematic diagram of a nailing transit manipulator according to some embodiments of the present disclosure.
Figure 23:
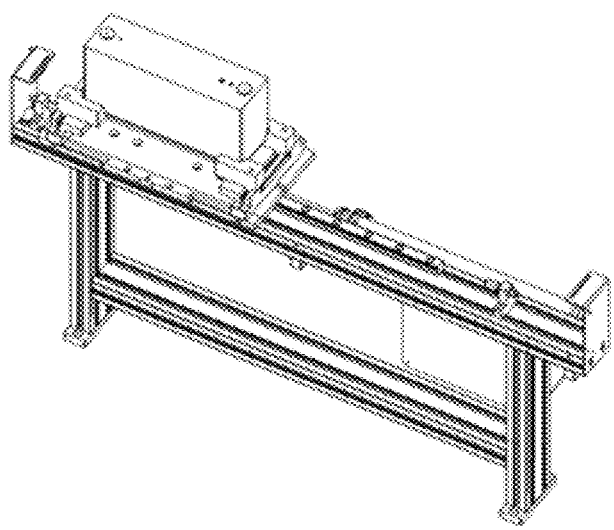
FIG. 23 is a stereoscopic structural schematic diagram of an unloading-buffering-mating pull belt according to some embodiments of the present disclosure.
Figure 24:
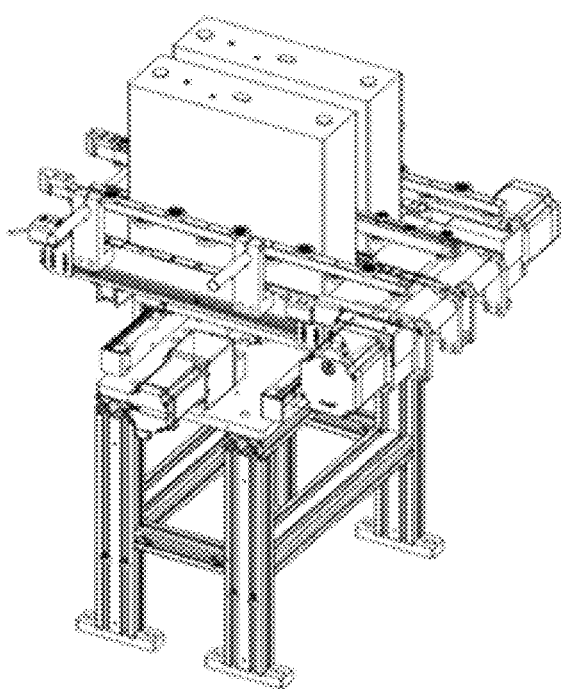
FIG. 24 is a stereoscopic structural schematic diagram of an unloading pull belt according to some embodiments of the present disclosure.
Figure 25:
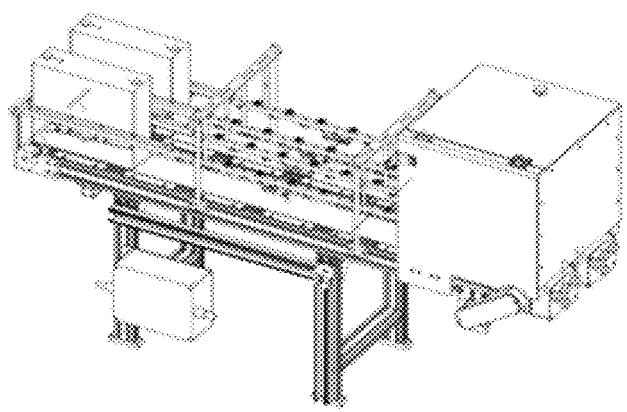
FIG. 25 is a stereoscopic structural schematic diagram of a defective unloading pull belt according to some embodiments of the present disclosure.
Figure 26:
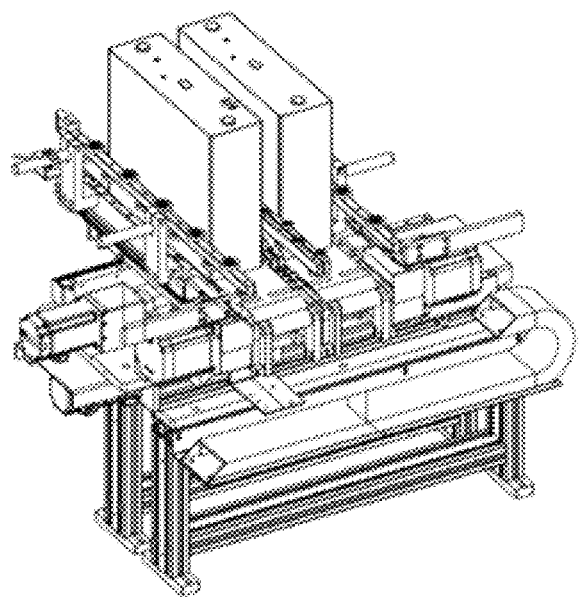
FIG. 26 is a stereoscopic structural schematic diagram of an incoming material spacing-varying pull belt according to some embodiments of the present disclosure.

FIG. 1 is a top view of a liquid injection device according to some embodiments of the present disclosure; FIG. 2 is a stereoscopic structural schematic diagram of a plurality of liquid injection apparatuses according to some embodiments of the present disclosure from a first perspective; FIG. 3 is a stereoscopic structural schematic diagram of a plurality of liquid injection apparatuses according to some embodiments of the present disclosure from a second perspective; FIG. 4 is a stereoscopic structural schematic diagram of a liquid injection apparatus according to some embodiments of the present disclosure from a first perspective; FIG. 5 is a stereoscopic structural schematic diagram of a liquid injection apparatus according to some embodiments of the present disclosure from a second perspective; FIG. 6 is a stereoscopic structural schematic diagram of a liquid injection apparatus according to some embodiments of the present disclosure from a third perspective; FIG. 7 is a stereoscopic structural schematic diagram of a liquid injection apparatus according to some embodiments of the present disclosure from a fourth perspective; FIG. 8 is a stereoscopic structural schematic diagram of a liquid injection cup according to some embodiments of the present disclosure; FIG. 9 is a stereoscopic structural schematic diagram of a battery clamp according to some embodiments of the present disclosure from a first perspective; FIG. 10 is a stereoscopic structural schematic diagram of a battery clamp according to some embodiments of the present disclosure from a second perspective; FIG. 11 is a stereoscopic structural schematic diagram of a nail pre-pressing mechanism, a nail full-pressing mechanism, a sealing nail detection apparatus, a cleaning mechanism, and a nailing conveying mechanism according to some embodiments of the present disclosure; FIG. 12 is a stereoscopic structural schematic diagram of a nailing conveying mechanism according to some embodiments of the present disclosure; FIG. 13 is an enlarged view of position A in FIG. 12; FIG. 14 is a stereoscopic structural schematic diagram of a cleaning mechanism and part of a nailing conveying mechanism according to some embodiments of the present disclosure; FIG. 15 is a stereoscopic structural schematic diagram of an incoming material code-scanning apparatus according to some embodiments of the present disclosure; FIG. 16 is a stereoscopic structural schematic diagram of a preliminary weighing apparatus according to some embodiments of the present disclosure; FIG. 17 is a stereoscopic structural schematic diagram of a subsequent weighing apparatus according to some embodiments of the present disclosure; FIG. 18 is a stereoscopic structural schematic diagram of a defective incoming pull belt according to some embodiments of the present disclosure; FIG. 19 is a stereoscopic structural schematic diagram of a liquid injection loading-unloading manipulator according to some embodiments of the present disclosure; FIG. 20 is a stereoscopic structural schematic diagram of a first transit apparatus according to some embodiments of the present disclosure; FIG. 21 is a stereoscopic structural schematic diagram of a second transit apparatus according to some embodiments of the present disclosure; FIG. 22 is a stereoscopic structural schematic diagram of a nailing transit manipulator according to some embodiments of the present disclosure; FIG. 23 is a stereoscopic structural schematic diagram of an unloading-buffering-mating pull belt according to some embodiments of the present disclosure; FIG. 24 is a stereoscopic structural schematic diagram of an unloading pull belt according to some embodiments of the present disclosure; FIG. 25 is a stereoscopic structural schematic diagram of a defective unloading pull belt according to some embodiments of the present disclosure; and FIG. 26 is a stereoscopic structural schematic diagram of an incoming material spacing-varying pull belt according to some embodiments of the present disclosure.

In some embodiments of the present disclosure, for ease of explanation, a first direction and a second direction are set, the first direction, the second direction, and a vertical direction are directions intersecting one another, and here, intersecting one another includes intersecting one another perpendicularly. For ease of understanding the embodiments of the present disclosure, in the embodiments shown in FIGS. 1 to 27, explanation is done with examples where the first direction, the second direction, and the vertical direction are those intersecting one another perpendicularly, but those skilled in the art should understand that the embodiments of the present disclosure are not limited to the case where the three directions intersect one another perpendicularly. For ease of explanation, as shown by the arrows in FIGS. 1 to 7, 11, and 12, a direction where arrow X is located is used as the first direction, a direction where arrow Y is located is used as the second direction, and a direction where arrow Z is located is used as the vertical direction. A direction that the arrow Z points to along a third direction is sometimes referred to as "above", and an opposite direction thereto is sometimes referred to as "below".

A first aspect of the disclosure provides a liquid injection device, as shown in FIGS. 1 to 7, including a liquid injection apparatus 1, the liquid injection apparatus 1 including a battery clamp 11, a position adjustment mechanism 12, and a liquid injection mechanism 13. The battery clamp 11 is provided with at least one battery accommodating groove, and the battery accommodating groove has a set position therein; the position adjustment mechanism 12 is configured to be capable of adjusting a battery 100 that has been put in the battery accommodating groove and not located at the set position to the set position; the liquid injection mechanism 13 is configured to be capable of butting to a liquid injection port of the battery 100 located at the set position, and performing a liquid injection operation of injecting an electrolyte into the battery 100.

"The battery 100 that has been put in the battery accommodating groove and not located at the set position" means that after an action of putting the battery 100 in the battery accommodating groove is completed, the battery 100 is not located at the set position within the battery accommodating groove. After the action of putting the battery 100 in the battery accommodating groove is completed and the battery 100 is not located at the set position, at least part of the battery 100 is located within the battery accommodating groove. Part of the battery 100 may be within the battery accommodating groove and the rest outside the battery accommodating groove, or the entirety of the battery 100 may be within the battery accommodating groove. When the battery 100 is located at the set position, the entirety of the battery 100 may be within the battery accommodating groove, or part of the battery 100 may be within the battery accommodating groove and the rest outside of the battery accommodating groove.

The position adjustment mechanism 12 may move the battery 100 by means of pushing, move the battery 100 by means of pressing down, move the battery 100 by means of jacking, move the battery 100, of course, by means of gripping, etc., all of which may cause the battery 100 to displace and thus move to the set position.

The battery accommodating groove of the battery clamp 11 may be provided to be variable in size or fixed in size. The size of the battery accommodating groove of the battery clamp 11 may be adapted to that of the battery 100, such that when the battery 100 is put in position through an access groove mouth 111 of the battery accommodating groove, the position of the battery 100 in all directions is restricted by the battery clamp 11, that is, surfaces of the battery 100 other than a surface facing the access groove mouth are all in contact with an inner wall of the battery accommodating groove or have a gap within a set range. In this case, when the battery 100 is put in position within the battery accommodating groove, that is, when an end face of one end of the battery 100 extending into the battery accommodating groove contacts a groove bottom face of the battery accommodating groove opposite to the groove access mouth, the battery 100 is located at the set position. However, when the battery 100 is not put in position, that is, when the end face of the end of the battery 100 extending into the battery accommodating groove has a gap with the groove bottom face of the battery accommodating groove, the battery 100 is not located at the set position. At this time, it is required to move the battery 100 toward the groove bottom face via the position adjustment mechanism 12 until contacting the groove bottom face, such that the battery 100 is moved to the set position. The size of the battery accommodating groove of the battery clamp 11 may also be significantly greater than that of the battery 100. When accommodated within the battery accommodating groove, the battery 100 may move in a direction perpendicular to a putting-in direction for the battery 100. In this case, the position adjustment mechanism 12 causes the battery 100 to move to the set position within the battery accommodating groove by moving the battery 100 along the putting-in direction for the battery 100 or the direction perpendicular to the putting-in direction for the battery 100 or other directions.

When liquid injection is performed on the battery 100 with the liquid injection device provided by the present disclosure, the battery 100 is first put in the battery accommodating groove of the battery clamp 11. For the battery 100 that is not located at the set position, position adjustment is performed with the position adjustment mechanism 12 such that the battery 100 moves to the set position. Since the position of the battery 100 is corrected, the liquid injection mechanism 13 can be accurately butted to the liquid injection port of the battery 100, thereby enabling improvement in the accuracy of butting of the liquid injection mechanism 13 to the liquid injection port of the battery 100.

In some embodiments of the present disclosure, as shown in FIGS. 5 and 7, the liquid injection apparatus 1 further includes a detection apparatus 14, the detection apparatus 14 being configured to be capable of detecting whether the battery 100 put in each of the battery receiving grooves is located at each of the set positions, and if it is detected that at least one battery 100 is not located at the set position, adjusting the battery 100 that is not located at the set position to the set position through the position adjustment mechanism 12.

"Whether the battery 100 that has been put in each of the battery accommodating grooves is located at each of the set positions" means whether all the batteries 100 that have been put in the battery accommodating grooves of the same battery clamp 11 are at the set positions within the battery accommodating grooves. When at least one of all the batteries 100 put in the same battery clamp 11 is not at the set position, it is required to use the position adjustment mechanism 12 for adjustment. When all the batteries 100 are at the set positions within their corresponding battery accommodating grooves, using the position adjustment mechanism 12 is not required.

Through the detection by the detection apparatus 14, it is possible to judge whether the battery 100 put in the battery clamp 11 needs to be subjected to position adjustment. The position adjustment mechanism 12 is used when needed, and the position adjustment mechanism 12 may not be used when not needed. As such, automatic detection is achieved, the accuracy and efficiency of detection are improved, and useless operations performed by the position adjustment mechanism 12 may further be reduced, improving the operational efficiency of battery liquid injection.

In some embodiments of the present disclosure, an upper portion of the battery accommodating groove is provided with an access groove mouth 111, and the position adjustment mechanism 12 is configured to be capable of pressing the battery 100 from top down such that the battery 100 moves to the set position within the battery accommodating groove.

The access groove mouth 111 is provided in the upper portion of the battery accommodating groove, such that the putting-in direction for the battery 100 is from top down, that is, the battery 100 needs to be mounted within the battery accommodating groove from top down. In this case, after the battery 100 is put through the access groove mouth 111 from top down, the battery 100 may be released. The battery 100 automatically moves down under the action of gravity and continues to enter the battery accommodating groove. A pushing action of continuing to push the battery 100 in may be omitted, which is conducive to improving the efficiency of operation.

However, after the battery 100 is put through the access groove mouth 111, if the upper portion of the battery 100 is slightly skewed or there is an error in the size of the access groove mouth 111, there may be the case that the battery 100 is stuck and cannot continue to move down, resulting in inability to move to the set position, and accordingly, the battery 100 may be pushed to the set position by means of the position adjustment mechanism 12 pressing the battery 100 from top down, thereby enabling regulation of the battery 100 position. Such regulation means is simple in action and has high regulation efficiency.

In some embodiments of the present disclosure, if the battery 100 is fully accommodated within the battery accommodating groove, the battery 100 is located at the set position. The detection apparatus 14 is disposed outside the access groove mouth 111. If part of the battery 100 extends out of the battery accommodating groove from the access groove mouth 111, the detection apparatus 14 is triggered.

When the entirety of the battery 100 enters the battery accommodating groove, the battery 100 is located at the set position. It can be understood that after the action of putting the battery 100 in the battery accommodating groove is completed, if the entirety of the battery 100 is accommodated within the battery accommodating groove, that is, the battery 100 has no portion extending from the access groove mouth 111, then the battery 100 is located at the set position; if part of the battery 100 still extends out from the access groove mouth 111, it indicates that the battery 100 is not located at the set position. Therefore, when the detection apparatus 14 is triggered, it can be detected that part of the battery 100 extends out of the battery accommodating groove, thereby judging that the battery 100 is not located at the set position; when the detection apparatus 14 is not triggered, it is judged that the battery 100 is located at the set position.

Exemplarily, the detection apparatus 14 includes a through-beam sensor. A through-beam area of the through-beam sensor is located outside the access groove mouth 111 and close to the access groove mouth 111. Part of the battery 100 extending out from the access groove mouth 111 enters the through-beam area of the through-beam sensor, thereby triggering the through-beam sensor. The through-beam sensor may be an infrared through-beam sensor, a laser through-beam sensor, an ultrasonic through-beam sensor or the like.

When the battery 100 is located at the set position, the battery 100 is fully accommodated within the battery accommodating groove, which may improve the limiting effect of the battery accommodating groove for the battery 100 and improve the position stability of the battery 100, thus facilitating the improvement in the butting accuracy for the liquid injection mechanism 13 and the battery 100. Furthermore, the detection apparatus 14 judges whether the battery 100 is located at the set position by detecting whether the battery 100 extends out of the access groove mouth 111, enabling an automatic detection function and improving the accuracy and efficiency of detection.

In some embodiments of the present disclosure, as shown in FIGS. 4 to 7, the liquid injection apparatus 1 further includes a moving mechanism 15. The battery clamp 11 is provided at the moving mechanism 15, and capable of moving between a detection position, an adjustment position, and a liquid injection position under the action of the moving mechanism 15. The detection apparatus 14 detects the battery 100 within the battery clamp 11 located at the detection position. If it is detected that at least one battery 100 is not located at the set position, the moving mechanism 15 moves the battery clamp 11 to the adjustment position such that the position adjustment mechanism 12 adjusts the battery 100, and if it is detected that each of the batteries 100 is located at each of the set positions, the moving mechanism 15 moves the battery clamp 11 to the liquid injection position such that the liquid injection mechanism 13 injects an electrolyte into the battery 100.

The moving mechanism 15 may be any mechanism that is capable of transferring the position of the battery clamp 11, a sliding module that brings the battery clamp 11 to change the position by sliding along a fixed path, a manipulator that transfers the position by gripping, or, of course, another mechanism that is capable of transferring the battery clamp 11, which will not be repeated here.

The moving mechanism 15 is used to transfer the battery 100 between the detection position, the adjustment position, and the liquid injection position to carry forward a subsequent position adjustment action or liquid injection action such that the liquid injection operation proceeds smoothly.

In some embodiments of the present disclosure, as shown in FIG. 4, the moving mechanism 15 includes a moving carrier 151, a sliding guide rail 152, a sliding carrier plate 153, and a sliding driving mechanism. The sliding guide rail 152 is mounted on the moving carrier 151. The sliding carrier plate 153 is slidably connected to the sliding guide rail 152 along a first direction X intersecting a vertical direction Z. The sliding carrier plate 153 is used to carry the battery clamp 11. The sliding driving mechanism is mounted at the moving carrier 151, and is configured to drive the sliding carrier plate 153 to reciprocate in the first direction X to drive the battery clamp 11 carried at the moving carrier 151 to move between the detection position, the adjustment position, and the liquid injection position.

The sliding driving mechanism includes, but is not limited to, a screw-nut transmission mechanism, a ball screw mechanism, a linear cylinder, a linear motor, or the like, as long as it is a mechanism that is capable of providing linear driving for the sliding carrier plate 153.

In some embodiments of the present disclosure, as shown in FIGS. 5 and 6, the liquid injection apparatus 1 further includes a liquid injection base 16, and at least part of the position adjustment mechanism 12 and at least part of the liquid injection mechanism 13 are connected to opposite two sides of the liquid injection base 16, respectively.

The liquid injection base 16 is a mounting base for mounting the position adjustment mechanism 12 and the liquid injection mechanism 13. The liquid injection base 16 may be any structure adapted to mount the position adjustment mechanism 12 and the liquid injection mechanism 13, and may be, but is not limited to, a plate-like structure.

Exemplarily, at least part of the position adjustment mechanism 12 and at least part of the liquid injection mechanism 13 are, respectively, connected to opposite two sides of the liquid injection base 16 along the first direction X.

The position adjustment mechanism 12 and the liquid injection mechanism 13 are both connected to the liquid injection base 16, which is conducive to structural compacting. Moreover, at least part of the position adjustment mechanism 12 and at least part of the liquid injection mechanism 13 are connected to the opposite two sides of the liquid injection base 16, respectively, such that the opposite two sides of the liquid injection base 16 are loaded, which is beneficial to improving the stability of the liquid injection base 16.

In some embodiments of the present disclosure, as shown in FIG. 5, the position adjustment mechanism 12 includes a down-pressing pedestal 121 and a down-pressing structure 122. The down-pressing pedestal 121 is mounted at one side of the liquid injection base 16; the down-pressing structure 122 is provided at the down-pressing pedestal 121 and capable of ascending or descending in relation to the down-pressing pedestal 121, and the down-pressing structure 122 is capable of pressing the battery 100 from top down in a descending process.

As such, the function of the down-pressing structure 122 to press down the battery 100 is achieved, such that the position of the battery 100 can be adjusted, thereby improving the butting accuracy for the liquid injection port of the battery 100 and the liquid injection mechanism 13.

In some embodiments of the present disclosure, the position adjustment mechanism 12 further includes a down-pressing driving member 123. The down-pressing driving member 123 is mounted at the down-pressing pedestal 121. An output end of the down-pressing driving member 123 is connected to the down-pressing structure 122, and is capable of driving the down-pressing structure 122 to ascend or descend.

The down-pressing driving member 123 may be, but is not limited to, a linear cylinder, a linear motor or the like.

In some embodiments of the present disclosure, the down-pressing structure 122 includes a presser head mounting member 1221 and at least one presser head 1222 connected to the presser head mounting member 1221. The quantity of the presser heads 1222 is the same as that of the battery accommodating grooves of the battery clamp 11. The presser head mounting member 1221 is connected to the output end of the down-pressing driving member 123. When the down-pressing driving member 123 drives the presser head mounting member 1221 to descend, the presser head 1222 is brought to descend, such that individual presser heads 1222 press down individual batteries 100 put in the battery clamp 11 in one to one correspondence.

The presser head 1222 is made of an elastic material including but not limited to rubber etc. such that the presser head 1222 is in elastic contact with a top cover of the battery 100, reducing the chances of damaging the battery 100 in the down-pressing process.

In some embodiments of the present disclosure, the liquid injection mechanism 13 includes a liquid injection mount 131 and a liquid injection unit 132. The liquid injection mount 131 is mounted at the other side of the liquid injection base 16 opposite to the down-pressing pedestal 121 and capable of ascending or descending in relation to the liquid injection base 16; the liquid injection unit 132 is mounted at the liquid injection mount 131, and the liquid injection unit 132 is configured to be capable of injecting an electrolyte into the battery 100 butted thereto; in a process of the liquid injection mount 131 descending, the liquid injection unit 132 can be brought to butt to the battery 100 located at the set position.

When each of the batteries 100 put in the battery clamp 11 is located at each of the set positions, the liquid injection mount 131 brings the liquid injection unit 132 to descend until the liquid injection unit 132 butts to the battery 100 located at the set position, and then the liquid injection unit 132 injects an electrolyte into the battery 100 butted thereto.

As such, the function of butting the liquid injection mechanism 13 to the battery 100 and injecting the electrolyte into the battery 100 is achieved. Furthermore, with the provision of the position adjustment mechanism 12, each battery 100 may be located at each set position, thereby improving the accuracy of butting of the liquid injection unit 132 to the battery 100.

In some embodiments of the present disclosure, as shown in FIG. 6, the liquid injection mechanism 13 further includes a butting driving member 133. The butting driving member 133 is mounted to the liquid injection base 16. An output end of the butting driving member 133 is connected to the liquid injection mount 131, and is capable of driving the liquid injection mount 131 to ascend or descend in relation to the liquid injection base 16.

The butting driving member 133 may be, but is not limited to, a linear cylinder, a linear motor or the like.

In some embodiments of the present disclosure, one of the liquid injection mount 131 and the liquid injection base 16 is provided with a first slide rail, and the other is provided with a first slider. The first slide rail extends along the vertical direction Z, and the first slider is slidably connected to the first slide rail.

As such, the stability of ascent and descent of the liquid injection mount 131 is improved.

In some embodiments of the present disclosure, as shown in FIGS. 4 and 6, the liquid injection unit 132 includes a liquid inlet main pipe 1321, an incoming liquid pipe 1322, a negative pressure air pipe 1323, a liquid injection cup 1324, and a liquid outlet nozzle 1325. An incoming end of the incoming liquid pipe 1322 is used to connect to an electrolyte introduction pipeline, and a discharge end is connected to the liquid inlet main pipe 1321. An incoming end of the negative pressure air pipe 1323 is connected to a vacuum pump, and a discharge end is connected to the liquid inlet main pipe 1321. The liquid inlet main pipe 1321 is connected to an inlet of the liquid injection cup 1324, and an outlet of the liquid injection cup 1324 is connected to the liquid outlet nozzle 1325. The liquid outlet nozzle 1325 is used to butt to the liquid injection port of the battery 100.

After the liquid outlet nozzle 1325 is butted to the liquid injection port of the battery 100, the vacuum pump is activated to evacuate an inner chamber of the battery 100. After the evacuating is completed, an electrolyte is injected into the liquid injection cup 1324, and the electrolyte is injected into the battery 100 through the liquid outlet nozzle 1325, completing the liquid injection.

Exemplarily, the negative pressure air pipe 1323 is equipped with an evacuating valve 1326, the incoming liquid pipe 1322 is equipped with an incoming liquid valve 1327, and a liquid injection valve 1328 is connected between the liquid outlet nozzle 1325 and the liquid injection cup 1324. The evacuating valve 1326, the incoming liquid valve 1327, and the liquid injection valve 1328, respectively, control blocking or unblocking of their respective lines.

In some embodiments of the present disclosure, as shown in FIG. 7, the down-pressing pedestal 121 has a mounting space within, and the liquid injection mechanism 13 further includes a residual liquid receiving driving member 137 and a residual liquid receiving box 134. The residual liquid receiving driving member 137 is mounted within the mounting space of the down-pressing pedestal 121; the residual liquid receiving box 134 is connected to an output end of the residual liquid receiving driving member 137. The residual liquid receiving box 134 is capable of moving between a residual liquid receiving position and a retracted position under the driving of the residual liquid receiving driving member 137. The residual liquid receiving box 134 located at the residual liquid receiving position is located below the liquid outlet nozzle 1325 of the liquid injection unit 132 and capable of butting to the liquid outlet nozzle 1325 of the liquid injection unit 132 to receive a residual liquid flowing out of the liquid injection unit 132, and the residual liquid receiving box 134 located at the retracted position is vertically misaligned with the liquid outlet nozzle of the liquid injection unit 132 in the vertical direction Z.

Exemplarily, the residual liquid receiving position and the retracted position are spaced apart from each other in the first direction X, and the residual liquid receiving driving member 137 is configured to drive the residual liquid receiving box 134 to reciprocate along the first direction X intersecting the vertical direction Z.

After the liquid injection unit 132 finishes injecting a liquid into the battery 100, the liquid injection unit 132 ascends, and the residual liquid receiving driving member 137 drives the residual liquid receiving box 134 to move to the residual liquid receiving position, such that a residual liquid inlet of the residual liquid receiving box 134 directly faces the liquid outlet 1325 of the liquid injection unit 132 in the vertical direction Z, and the residual liquid receiving box 134 is located below the liquid outlet nozzle of the liquid injection unit 132. Then, the liquid injection unit 132 descends until the liquid outlet nozzle of the liquid injection unit 132 is butted to the residual liquid inlet of the residual liquid receiving box 134. At this time, the residual liquid flowing out of the liquid outlet nozzle of the liquid injection unit 132 can enter the residual liquid receiving box 134. After the residual liquid all flows out, the liquid injection unit 132 ascends, and the residual liquid receiving driving member 137 drives the residual liquid receiving box 134 to move to the retracted position, leaving space for the liquid injection unit 132 to pass through when ascending and descending, such that next butting of the liquid injection unit 132 to the battery 100 proceeds smoothly.

As such, collection of the residual liquid after the injection operation is achieved, reducing the impact on the ambient environment. Moreover, the residual liquid receiving driving member 137 is mounted within the mounting space of the down-pressing pedestal 121, such that the residual liquid receiving driving member 137 and the down-pressing structure 122 are mounted together at the down-pressing pedestal 121. Moreover, the mounting space of the down-pressing pedestal 121 accommodates the residual liquid receiving driving member 137, which reduces space occupation and makes the structure more compact.

In some embodiments of the present disclosure, the liquid injection unit 132 further includes a positive pressure air pipe, one end of the positive pressure air pipe is connected to the liquid injection cup 1324, and the other end is connected to an air pump.

After the liquid outlet nozzle of the liquid injection unit 132 is butted to the residual liquid inlet of the residual liquid receiving box 134, the air pump is activated to blow air into the liquid injection cup 1324 through the positive pressure air pipe, and the air enters the residual liquid receiving box 134 via the liquid outlet nozzle 1325. Under the blowing of the air, the residual liquid hanging on a wall inside the liquid injection cup 1324 is blown into the residual liquid receiving box 134. Accordingly, adequacy of residual liquid discharging is improved.

Exemplarily, as shown in FIG. 7, the residual liquid receiving box 134 is connected to an air outlet pipe 135 and a liquid outlet pipe 136, the other end of the air outlet pipe 135 facing away from the residual liquid receiving box 134 is connected to an exhaust fan, and the exhaust fan exhausts an air flow within the residual liquid receiving box 134 such that the air flow is discharged through the air outlet pipe 135 and the residual liquid is discharged from the liquid outlet pipe 136.

In some embodiments of the present disclosure, as shown in FIG. 8, the liquid injection cup 1324 of the liquid injection unit 132 includes a cup body 13241, a first end cover 13242, and a second end cover 13243, the cup body 13241 is provided with an accommodating chamber and two openings, the two openings are, respectively, provided at opposite two ends of the cup body 13241, the first end cover 13242 and the second end cover 13243 are both connected to the cup body 13241 via fasteners such as bolts and, respectively, cover the two openings, and sealing rings are provided, in clamped manner, between the first end cover 13242 and an end face of one end of the cup body 13241 and between the second end cover 13243 and an end face of the other end of the cup body 13241.

As such, sealing of the liquid injection cup 1324 may be improved, assembly of the liquid injection cup 1324 is simple and reliable to operate, and the requirements on assembly are low.

In some embodiments of the present disclosure, at least two liquid injection apparatuses 1 are provided, and the at least two liquid injection apparatuses 1 are disposed sequentially along a second direction Y intersecting the first direction X, and the individual liquid injection apparatuses 1 operate independently of each other. As such, efficiency of liquid injection for the battery 100 may be improved.

Exemplarily, as shown in FIGS. 1 to 3, five liquid injection apparatuses 1 are provided, and the five liquid injection apparatuses 1 are disposed sequentially along the second direction Y.

In some embodiments of the present disclosure, as shown in FIGS. 9 and 10, the battery clamp 11 includes an outer box 112 and at least one partition plate 113 provided within the outer box 112, and the partition plate 113 partitions a space within the outer box 112 into at least two battery accommodating grooves.

As such, the battery clamp 11 is simple in structure, and the cost is low.

In some embodiments of the present disclosure, as shown in FIGS. 5 to 7 and 10, a bottom wall of the battery clamp 11 opposite to the access groove mouth 111 is provided with a jacking opening 114, the liquid injection apparatus 1 further includes a jacking mechanism 17, the jacking mechanism 17 includes an ejector rod 171, and the ejector rod 171 is configured to be capable of reciprocating along the vertical direction Z in relation to the battery clamp 11. In the process of ascending, the ejector rod 171 is capable of extending into the battery accommodating groove through the jacking opening 114 to jack the battery 100 within the battery accommodating groove, such that at least part of the battery 100 extends out from the access groove mouth 111.

As such, after the battery 100 is finished with the liquid injection operation, with at least part of the battery 100 extended out from the access groove mouth 111, it is convenient for the battery 100 to transfer to the next apparatus.

In some embodiments of the present disclosure, as shown in FIG. 7, the jacking mechanism 17 further includes an ejector rod mounting bracket 172 and a jacking driving member 173. The ejector rod mounting bracket 172 is slidably connected to the moving carrier 151 along the vertical direction Z. The jacking driving member 173 is mounted to the moving carrier 151. The ejector rod 171 is connected to the ejector rod mounting bracket 172 and extends along the vertical direction Z. The ejector rod mounting bracket 172 is connected to an output end of the jacking driving member 173, and capable of reciprocating along the vertical direction Z under the driving of the jacking driving member 173, bringing the ejector rod 171 to reciprocate along the vertical direction Z. In the process of ascending, the ejector rod 171 is capable of extending into the battery accommodating groove through the jacking opening 114 to jack the battery 100 within the battery accommodating groove, such that at least part of the battery 100 extends out of the access groove mouth 111.

Exemplarily, the jacking driving member 173 includes but is not limited to a linear cylinder or a linear motor.

In some embodiments of the present disclosure, as shown in FIG. 11, the liquid injection device further includes a nailing conveying mechanism 21, a nail pre-pressing mechanism 22, and a nail full-pressing mechanism 23. The nailing conveying mechanism 21 is configured to convey a battery 100 that has completed the liquid injection operation, and capable of sequentially conveying the battery 100 to a nail pre-pressing station and a nail full-pressing station; the nail pre-pressing mechanism 22 is configured to pre-press a sealing nail into a liquid injection port of the battery 100 located at the nail pre-pressing station; the nail full-pressing mechanism 23 is configured to press the sealing nail of the battery 100 located at the nail full-pressing station such that the sealing nail is mounted in position.

The nailing conveying mechanism 21 may be any conveying mechanism suitable for conveying the battery 100, and may be, but is not limited to, a belt conveyor, a roller conveyor, a chain conveyor or the like.

The nail pre-pressing mechanism 22 is a mechanism for pre-pressing the sealing nail into the liquid injection port of the battery 100. The nail pre-pressing mechanism 22 may be any mechanism in the related art that is capable of pre-pressing the sealing nail. For the specific structure and working principle, reference may be made to the related art, and there will be no repeating here.

The nail full-pressing mechanism 23 is a mechanism for pressing the sealing nail and mounting the sealing nail in position. The nail full-pressing mechanism 23 may be any mechanism in the related art that is capable of full-pressing the sealing nail. For the specific structure and working principle, reference may be made to the related art, and there will be no repeating here.

The nailing conveying mechanism 21 first conveys the battery 100 that has completed the liquid injection operation to the nail pre-pressing station, and the nail pre-pressing mechanism 22 pre-presses the sealing nail into the liquid injection port of the battery 100 that has been conveyed to the nail pre-pressing station. Then, the nailing conveying mechanism 21 conveys the battery 100 with the sealing nail pressed therein to the nail full-pressing station, and the nail full-pressing mechanism 23 presses the sealing nail located in the battery 100 that has been conveyed to the nail full-pressing station, such that the sealing nail is mounted in position, thereby completing sealing of the liquid injection port.

As such, the sealing of the liquid injection port of the battery 100 is achieved, and the chances of battery 100 leakage are reduced.

In some embodiments of the present disclosure, as shown in FIGS. 12 and 13, the nailing conveying mechanism 21 includes a conveyor belt 211 and at least two fixed blocks 214. The conveyor belt 211 is configured to transmit power along a conveying direction; the at least two fixed blocks 214 are sequentially provided along the conveying direction and connected to the conveyor belt 211, the adjacent fixed blocks 214 are used to limit the opposite two sides of the battery 100, and a spacing of the adjacent fixed blocks 214 is adjustable.

The adjacent fixed blocks 214 limit the opposite two sides of the battery 100. When transmitting power, the conveyor belt 211 brings the battery 100 in motion. When the battery 100 needs to be pre-pressed or full-pressed, the conveyor belt 211 stops transmitting power. Since the adjacent fixed blocks 214 limit the opposite two sides of the battery 100, the battery 100 may be limited to the nail pre-pressing station or the nail full-pressing station, such that it is possible to cooperate with the nail pre-pressing mechanism 22 or the nail full-pressing mechanism 23 to enable an action of nail pre-pressing or nail full-pressing for the battery 100.

As such, a function of the nailing conveying mechanism 21 to convey batteries 100 to the nail pre-pressing station or the nail full-pressing station is achieved. Moreover, by varying the spacing of the adjacent fixed blocks 214, it is possible for use to limit batteries 100 of different sizes, thereby improving compatibility.

In some embodiments of the present disclosure, the conveyor belt 211 includes a first conveyor belt 2111 and a second conveyor belt 2112 disposed side by side in a direction perpendicular to the conveying direction, and adjacent two of the fixed blocks 214 are, respectively, connected to the first conveyor belt 2111 and the second conveyor belt 2112, and the first conveyor belt 2111 and the second conveyor belt 2112 are configured to be capable of synchronously transmitting power along the conveying direction to convey batteries, and the first conveyor belt 2111 and the second conveyor belt 2112 are also configured to be capable of moving relatively along the conveying direction to regulate the spacing of the adjacent two of the fixed blocks 214.

The first conveyor belt 2111 and the second conveyor belt 2112 convey the batteries 100 when transmitting power synchronously. When it is required to regulate the spacing of the adjacent fixed blocks 214, the first conveyor belt 2111 and the second conveyor belt 2112 are moved relatively, thereby bringing the adjacent fixed blocks 214 to move relatively along the conveying direction, thereby changing the spacing of the fixed blocks 214.

As such, a function of regulating the spacing of the adjacent fixed blocks 214 is achieved, enabling suitability for conveying batteries 100 of different sizes and improving compatibility.

Exemplarily, the nailing conveying mechanism 21 further includes a first conveying driving assembly and a second conveying driving assembly that, respectively, drive the first conveyor belt 2111 and the second conveyor belt 2112 to transmit power. The first conveying driving assembly and the second conveying driving assembly provide driving independently of each other. The first conveying driving assembly and the second conveying driving assembly allow batteries 100 to be conveyed when driving the first conveyor belt 2111 and the second conveyor belt 2112 to transmit power synchronously, allow adjacent fixed blocks 214 to move relatively when driving the first conveyor belt 2111 and the second conveyor belt 2112 to transmit power at different transmission speeds, thereby varying the spacing, and stop the transmission or change to synchronous transmission when the spacing reaches a predetermined spacing, allowing the spacing of the adjacent fixed blocks 214 to be maintained, thereby limiting the batteries 100. The first conveying driving assembly and the second conveying driving assembly both are structures capable of driving the conveyor belts for transmission. For the specific structures, reference may be made to the related art, and there will no repeating here.

In some embodiments of the present disclosure, the conveyor belt 211 further includes a third conveyor belt 2113, the third conveyor belt 2113 is disposed at a side of the second conveyor belt 2112 facing away from the first conveyor belt 2111, the fixed blocks 214 connected to the first conveyor belt 2111 are connected to the third conveyor belt 2113, and the first conveyor belt 2111 and the third conveyor belt 2113 transmit power synchronously.

As such, the first conveyor belt 2111, the second conveyor belt 2112, and the third conveyor belt 2113 are disposed sequentially, the second conveyor belt 2112 is located at a middle position of the entirety of the conveyor belt 211, connecting to a middle part of the battery 100, and the first conveyor belt 2111 and the third conveyor belt 2113 are, respectively, connected to two edge portions of the battery 100. As such, the stability of connection of the fixed blocks 214 may be improved, thereby improving the reliability of limitation for the battery 100.

In some embodiments of the present disclosure, in a direction perpendicular to the conveying direction, a size of the second conveyor belt 2112 is greater than that of the first conveyor belt 2111, and greater than that of the third conveyor belt 2113.

As such, the stability of connection of the second conveyor belt 2112 to the fixed blocks 214 may be improved, thereby further improving the reliability of limitation for the battery 100.

In some embodiments of the present disclosure, as shown in FIGS. 12 and 13, the nailing conveying mechanism 21 further includes a first positioning assembly 212 and a second positioning assembly 213, the first positioning assembly 212 and the second positioning assembly 213 are provided on opposite two sides of the conveyor belt 211, and the first positioning assembly 212 and the second positioning assembly 213 are configured to be capable of pushing the battery 100 from two sides of the battery 100 in a direction perpendicular to the conveying direction to limit the position of the battery 100.

As such, with the first positioning assembly 212 and the second positioning assembly 213 pushing the battery 100 from two sides in the direction perpendicular to the conveying direction, it is possible to limit the battery 100 in its four directions, the battery 100 may be accurately positioned at the nail pre-pressing station and the nail full-pressing station, thereby increasing the smoothness level of sealing of the liquid injection port.

In some embodiments of the present disclosure, the first positioning assembly 212 includes a first pushing member 2121, the first pushing member 2121 is provided with a limiting groove 2122, the limiting groove 2122 includes a first pushing face 2123 facing the second positioning assembly 213 and two limiting faces 2124 facing each other along the conveying direction, and the first pushing member 2121 is configured to be capable of moving toward the second positioning assembly 213 such that the limiting groove 2122 is engaged to the battery 100.

Exemplarily, the first positioning assembly 212 further includes a first pushing driving member 2125, the first pushing driving member 2125 is mounted on one side of the conveyor belt 211, and an output end of the first pushing driving member 2125 is connected to the first pushing member 2121, enabling the first pushing member 2121 to be driven to move close to or away from the second positioning assembly 213. The first pushing driving member 2125 may be, but is not limited to, a linear cylinder or a linear motor.

As such, in a process of the first pushing member 2121 moving toward the second positioning assembly 213, the first pushing member 2121 gradually moves close to the battery 100 until the limiting groove 2122 of the first pushing member 2121 is engaged to the battery 100, such that the first pushing face 2123 of the limiting groove 2122 is abutted against a surface of the battery 100, and the two limiting faces 2124 are limited to the opposite two sides of the battery 100 along the conveying direction, thereby more reliably limiting the position of the battery 100.

In some embodiments of the present disclosure, the second positioning assembly 213 includes a clamping structure 2131, the clamping structure 2131 includes a first clamping head 2132 and a second clamping head 2133, and the first clamping head 2132 and the second clamping head 2133 are both provided with a clamping face 2134 and a second pushing face 2135. The clamping faces 2134 of the first clamping head 2132 and the second clamping head 2133 face each other in the conveying direction, and the second pushing faces 2135 both face the first pushing member 2121. The first clamping head 2132 and the second clamping head 2133 are configured to be capable of moving close to or far away from the first pushing member 2121, and capable of moving close to or far away from each other in the conveying direction.

Exemplarily, the clamping structure 2131 further includes a clamping holder 2136, and the first clamping head 2132 and the second clamping head 2133 are, respectively, movably connected to the clamping holder 2136 along the conveying direction. As such, by regulating the position of the first clamping head 2132 and/or the second clamping head 2133 along the conveying direction, a spacing of the clamping faces 2134 of the first clamping head 2132 and the second clamping head 2133 may be varied, thereby achieving clamping for the battery 100. Exemplarily, the first clamping head 2132 and the second clamping head 2133 both are provided with an elongated hole whose length direction is in the conveying direction, and the first clamping head 2132 and the second clamping head 2133 are, respectively, connected to the clamping holder 2136 via fasteners such as bolts.

Exemplarily, the second positioning assembly 213 further includes a second pushing driving member 2137. The second pushing driving member 2137 is mounted on the other side of the conveyor belt 211. An output end of the second pushing driving member 2137 is connected to the clamping holder 2136. The clamping holder 2136 is capable of moving close to or away from the first pushing member 2121 under the action of the second pushing driving member 2137, thereby allowing the first clamping head 2132 and the second clamping head 2133 to be configured to be capable of moving close to or far away from the first pushing member 2121. The second pushing driving member 2137 may be but is not limited to a linear cylinder or a linear motor.

In a process of the first clamping head 2132 and the second clamping head 2133 moving close to the first pushing member 2121, the first clamping head 2132 and the second clamping head 2133 gradually move close to the battery 100 until the second pushing faces 2135 of the first clamping head 2132 and the second clamping head 2133 abut against the battery 100, and then the first clamping head 2132 and the second clamping head 2133 move close to each other until the clamping faces 2134 of the first clamping head 2132 and the second clamping head 2133, respectively, clamp the opposite two surfaces of the battery 100, such that the battery 100 is clamped by the clamping structure 2131, which further improves the reliability of positioning for the battery 100.

It can be understood that two sides of the nail pre-pressing station along a direction perpendicular to the conveying direction are provided with a first positioning assembly 212 and a second positioning assembly 213, respectively, such that the battery 100 can be positioned at the nail pre-pressing station; two sides of the nail full-pressing station along a direction perpendicular to the conveying direction are provided with a first positioning assembly 212 and a second positioning assembly 213, respectively, such that the battery 100 can be positioned at the nail full-pressing station.

In some embodiments of the present disclosure, as shown in FIG. 11, the nailing conveying mechanism 21 is further capable of conveying the battery 100 to a detection station located downstream of the nail full-pressing station, the liquid injection device further includes a sealing nail detection apparatus 24, and the sealing nail detection apparatus 24 is configured to detect whether a sealing nail of the battery located at the detection station is mounted in position.

Exemplarily, two sides of the detection station along a direction perpendicular to the conveying direction are provided with a first positioning assembly 212 and a second positioning assembly 213, respectively, such that the battery 100 can be positioned at the detection station.

The sealing nail detection apparatus 24 is provided to detect whether mounting of the sealing nail is qualified, so as to subsequently pick out batteries 100 with unqualified sealing.

Exemplarily, the sealing nail detection apparatus 24 includes a CCD visual detection apparatus 241, the CCD visual detection apparatus 241 photographing the battery 100, and determining whether the photographed image is qualified by comparing the photographed image with a pre-stored image, so as to subsequently pick out unqualified products.

In some embodiments of the present disclosure, the nailing conveying mechanism 21 is further capable of conveying the battery 100 to a cleaning station located downstream of the detection station, the liquid injection device further includes a cleaning mechanism 25, the cleaning mechanism 25 is configured to clean the liquid injection port of the battery located at the cleaning station.

Exemplarily, two sides of the cleaning station along a direction perpendicular to the conveying direction are provided with a first positioning assembly 212 and a second positioning assembly 213, respectively, such that the battery 100 can be positioned at the cleaning station.

The cleaning mechanism 25 is provided to clean the liquid injection port, increasing cleanliness level of the battery 100.

In some embodiments of the present disclosure, as shown in FIG. 14, the cleaning mechanism 25 includes a cleaning liquid dripping mechanism 251, a cleaning cloth cutting mechanism 252, a wiping mechanism 253, and a lifting driving mechanism 254. The cleaning liquid dripping mechanism 251 is configured to drip a cleaning liquid to the battery 100. The cleaning cloth cutting mechanism 252 is configured to cut a piece of cleaning cloth from a cleaning cloth roll. The wiping mechanism 253 is configured to grab the piece of cleaning cloth. The lifting driving mechanism 254 brings the wiping mechanism 253 to move close to the battery 100 such that the piece of cleaning cloth grabbed by the wiping mechanism 253 contacts the liquid injection port of the battery 100. The wiping mechanism 253 brings the cleaning cloth in rotation, thereby wiping the liquid injection port.

In some embodiments of the present disclosure, the wiping mechanism 253 includes a wiping mounting bracket 2533, a rotary driving member 2531, and a wiping head 2532. The wiping mounting bracket 2533 is connected to an output end of the lifting driving mechanism 254. The rotary driving member 2531 is mounted to the wiping mounting bracket 2533. The wiping head 2532 is connected to an output end of the rotary driving member 2531 and capable of rotating under the driving of the rotary driving member 2531.

The wiping head 2532 contacts the battery 100 under the action of the lifting driving mechanism 254, and then rotates under the action of the rotary driving member 2531, thereby wiping and cleaning the battery 100. The lifting driving mechanism 254 includes but is not limited to a linear motor or a linear cylinder. The rotary driving member 2531 includes but is not limited to a rotary cylinder or a rotary motor.

In some embodiments of the present disclosure, as shown in FIGS. 1, 15, and 17, the liquid injection device further includes an incoming material code-scanning apparatus 3, a preliminary weighing apparatus 4, and a subsequent weighing apparatus 5. The incoming material code-scanning apparatus 3 is configured to receive the battery 100 and scan a code for the battery 100; the preliminary weighing apparatus 4 is located downstream of the incoming material code-scanning apparatus 3 and upstream of the liquid injection apparatus 1, and the preliminary weighing apparatus 4 is configured to be capable of weighing the battery 100; the subsequent weighing apparatus 5 is located downstream of the liquid injection apparatus 1 and upstream of the nailing conveying mechanism 21, and the subsequent weighing apparatus 5 is configured to weigh the battery 100 that has completed the liquid injection operation.

By measuring weight of the battery 100 before liquid injection and weight after liquid injection, it is possible to infer whether the weight of the battery 100 before liquid injection and the weight of the battery 100 after liquid injection are qualified, so as to screen out unqualified batteries 100.

In some embodiments of the present disclosure, as shown in FIG. 15, the incoming material code-scanning apparatus 3 includes a code-scanning conveying mechanism 31, a code-scanning stopping mechanism 32, and a first code scanner 33. The code-scanning stopping mechanism 32 and the first code scanner 33 both are provided above the code-scanning conveying mechanism 31. The code-scanning conveying mechanism 31 is used to convey the battery 100. The code-scanning stopping mechanism 32 is configured to stop the battery 100 directly below the first code scanner 33.

In the process of the code-scanning conveying mechanism 31 conveying the battery 100, the battery 100 is stopped by the code-scanning stopping mechanism 32. At this time, the battery 100 is located directly below the first code scanner 33, and the first code scanner 33 scans a code for the battery 100.

The code-scanning stopping mechanism 32 includes a stopping mounting bracket 321, a stopping driving member 322, and a stopping member 323. The stopping mounting bracket 321 is mounted to the code-scanning conveying mechanism 31. The stopping driving member 322 is mounted to the stopping mounting bracket 321. The stopping member 323 is connected to an output end of the stopping driving member 322, and capable of reciprocating along the vertical direction Z under the driving of the stopping driving member 322, thereby moving between a stopping position for stopping the battery 100 and an avoidance position for avoiding the battery 100. The stopping driving member 322 may be, but is not limited to, a linear cylinder or a linear motor.

In some embodiments of the present disclosure, as shown in FIG. 16, the preliminary weighing apparatus 4 includes a preliminary conveying mechanism 41, a preliminary stopping mechanism 42, and a preliminary weighing mechanism 43. The preliminary stopping mechanism 42 and the preliminary weighing mechanism 43 both are provided at the preliminary conveying mechanism 41. The preliminary conveying mechanism 41 is used to convey the battery 100. The preliminary stopping mechanism 42 is configured to stop the battery 100 such that the battery 100 is above the preliminary weighing mechanism 43. A carrying face of the preliminary conveying mechanism 41 carrying the battery 100 is capable of descending relative to the preliminary weighing mechanism 43, such that the battery 100 descends relative to the preliminary weighing mechanism 43, thereby causing the battery 100 to descend to be carried on the preliminary weighing mechanism 43. Thereafter, the preliminary weighing mechanism 43 weighs the battery 100.

The specific structure of the preliminary stopping mechanism 42 is similar to that of the code-scanning stopping mechanism 32, and the specific structure of the preliminary stop mechanism 42 will not be described in detail.

In some embodiments of the present disclosure, the preliminary conveying mechanism 41 includes a plurality of conveying rollers 411 disposed sequentially in spaced manner along the conveying direction, the plurality of conveying rollers 411 each rotate around the same direction such that the batteries 100 placed on the plurality of conveying rollers 411 are conveyed along the conveying direction, and the plurality of conveying rollers 411 are configured to be capable of descending simultaneously. The preliminary weighing mechanism 43 includes a plurality of weighing sensors 431. When the preliminary conveying mechanism 41 conveys the battery 100, the weighing sensors 431 are located below the conveying rollers 411. The battery 100 is carried on the conveying rollers 411 and moves under the action of the conveying rollers 411. After the preliminary stopping mechanism 42 stops the battery 100, the plurality of conveying rollers 411 descend simultaneously, such that the plurality of weighing sensors 431 extend out through gaps between the conveying rollers 411, thereby contacting and carrying the battery 100. At this time, the weight of the battery 100 may be detected by the weighing sensors 431.

The plurality of conveying rollers 411 are connected to a roller lifting driving member 413 via the roller mounting bracket 412, and reciprocate in the vertical direction Z under driving of the roller lifting driving member 413, thereby enabling relative motion with the weighing sensors 431 in the vertical direction Z.

In some embodiments of the present disclosure, as shown in FIG. 17, the subsequent weighing apparatus 5 includes a subsequent conveying mechanism 51, a subsequent stopping mechanism 52, and a subsequent weighing mechanism 53. The subsequent stopping mechanism 52 and the subsequent weighing mechanism 53 both are provided at the subsequent conveying mechanism 51. The subsequent conveying mechanism 51 is used to convey the battery 100. The subsequent stopping mechanism 52 is configured to stop the battery 100 such that the battery 100 is above the subsequent weighing mechanism 53. A carrying face of the subsequent conveying mechanism 51 carrying the battery 100 is capable of descending relative to the subsequent weighing mechanism 53, such that the battery 100 descends relative to the subsequent weighing mechanism 53, thereby causing the battery 100 to descend to be carried on the subsequent weighing mechanism 53. Thereafter, the subsequent weighing mechanism 53 weighs the battery 100.

The specific structure of the subsequent stopping mechanism 52 is similar to that of the code-scanning stopping mechanism 32, and the specific structure of the subsequent stop mechanism 52 is not described in detail. The specific structure of the subsequent weighing mechanism 53 is similar to that of the preliminary weighing mechanism 43 of the preliminary weighing apparatus 4, and the specific structure of the subsequent weighing mechanism 53 will not be described in detail.

In some embodiments of the present disclosure, the subsequent weighing apparatus 5 further includes a second code scanner 54, the second code scanner 54 is provided at the subsequent conveying mechanism 51, and the second code scanner 54 is used to scan a code for the battery 100 stopped at the subsequent conveying mechanism 51. As such, the subsequent weighing apparatus 5 has both the functions of weighing and code scanning.

In some embodiments of the present disclosure, as shown in FIGS. 1 and 19, the liquid injection device further includes a defective material pull belt 10, the defective incoming pull belt 10 is configured to be capable of receiving and conveying batteries 100 that are unqualified in code scanning and batteries 100 unqualified in weighing.

The defective incoming pull belt 10 is used to output unqualified batteries 100.

In some embodiments of the present disclosure, the defective incoming pull belt 10 is provided with a variety of indicator lights of different colors thereon for indicating the types unqualified separately, for example, indicating overweight, underweight, and poor code scanning, respectively, with red light, green light, and yellow light, to facilitate the classification and recycling of unqualified batteries 100, thereby facilitating subsequent repair and reuse.

In some embodiments of the present disclosure, as shown in FIGS. 19 to 22, the liquid injection device further includes a liquid injection loading-unloading manipulator 6, a first transit apparatus 7, a second transit apparatus 8, and a nailing transit manipulator 9. The liquid injection loading-unloading manipulator 6 is located downstream of the preliminary weighing apparatus 4, the liquid injection loading-unloading manipulator 6 is configured to be capable of transferring batteries 100 that are qualified in code scanning and qualified in weighing into the battery clamp 11 of the liquid injection apparatus 1, and further capable of removing the batteries that have completed the liquid injection operation; the first transit apparatus 7 is located downstream of the liquid injection apparatus 1 and upstream of the subsequent weighing apparatus 5, and is configured to receive the batteries transferred by the liquid injection loading-unloading manipulator 6 and convey them to the subsequent weighing apparatus 5; the second transit apparatus 8 is located downstream of the subsequent weighing apparatus 5 and upstream of the nailing conveying mechanism 21, and is configured to receive and convey the batteries from the subsequent weighing apparatus 5; the nailing transit manipulator 9 is located downstream of the second transit apparatus 8 and upstream of the nailing conveying mechanism 21, and is configured to be capable of transferring the batteries on the second transit apparatus 8 to the nailing conveying mechanism 21.

As such, the transit or transfer of batteries 100 between adjacent apparatuses is achieved.

In some embodiments of the present disclosure, as shown in FIG. 19, the liquid injection loading-unloading manipulator 6 includes a loading-unloading mounting bracket 61, a loading shifting driving module 62, a loading lifting driving module 63, a loading gripper 64, an unloading shifting driving module 65, an unloading lifting driving module 66, and an unloading gripper 67. The loading shifting driving module 62 and the unloading shifting driving module 65 both are mounted to the loading-unloading mounting bracket 61. The loading lifting driving module 63 is connected to an output end of the loading shifting driving module 62, and is capable of reciprocating along a second direction Y intersecting both the first direction X and the vertical direction Z under the driving of the loading shifting driving module 62, the loading gripper 64 is connected to an output end of the loading lifting driving module 63, and is capable of reciprocating along the vertical direction Z under the driving of the loading lifting driving module 63, and the loading gripper 64 is used to grab the battery 100; the unloading lifting driving module 66 is connected to an output end of the unloading shifting driving module 65, and is capable of reciprocating along the second direction Y intersecting both the first direction X and the vertical direction Z under the driving of the unloading shifting driving module 65, the unloading gripper 67 is connected to an output end of the unloading lifting driving module 66, and is capable of reciprocating along the vertical direction Z under the driving of the unloading lifting driving module 66, and the unloading gripper 67 is used to grab the battery 100.

Exemplarily, the loading gripper 64 and the unloading gripper 67 may be, but are not limited to, gripper cylinders.

As such, the loading gripper 64 is capable of grabbing the battery 100 output by the preliminary weighing apparatus 4, and put the battery that is qualified in code scanning and qualified in weighing into the battery accommodating groove through the access groove mouth 111 of the battery clamp 11 located at the detection position. The unloading gripper 67 is capable of removing the battery 100 that has completed the liquid injection operation from within the battery clamp 11 located at the detection position and transferring to the first transit apparatus 7 to achieve loading and unloading of the liquid injection apparatus 1.

Exemplarily, the first transit apparatus 7 includes a conveying mechanism, capable of carrying the transferred battery 100 and conveying the battery 100 to convey the battery 100 to the subsequent weighing apparatus 5.

Exemplarily, the second transit apparatus 8 includes a conveying mechanism and a stopping mechanism, capable of carrying the transferred battery 100 and conveying the battery 100, and further capable of fixing the position of the battery 100 by means of blocking, to facilitate transfer of the battery 100 by the nailing transit manipulator 9.

Exemplarily, as shown in FIG. 22, the nailing transit manipulator 9 includes a transit mounting bracket 91, a transit shifting driving module 92, a transit lifting driving module 93, and a transit gripper 94. The transit shifting driving module 92 is mounted to the transit mounting bracket 91. The transit lifting driving module 93 is connected to an output end of the transit shifting driving module 92, and is capable of reciprocating along the second direction Y under the driving of the transit shifting driving module 92. The transit gripper 94 is connected to an output end of the transit lifting driving module 93, and is capable of reciprocating along the vertical direction Z under the driving of the transit lifting driving module 93. The transit gripper 94 is capable of grabbing the battery 100. Exemplarily, the transit gripper 94 may be, but is not limited to, a gripper cylinder.

In some embodiments of the present disclosure, as shown in FIGS. 1 and 23 to 25, an unloading manipulator 60 is provided downstream of the nailing conveying mechanism 21, an unloading-buffering-mating pull belt 20, an unloading pull belt 30, and a defective unloading pull belt 40 are provided beside the unloading manipulator 60, and the unloading manipulator 60 is capable of grabbing the battery 100 from an unloading grabbing position of the nailing conveying mechanism 21, and transferring the battery 100 to the unloading-buffering-mating pull belt 20, the unloading pull belt 30, or the defective unloading pull belt 40 according to the aforementioned detection structure.

The specific structure of the unloading manipulator 60 is similar to that of the nailing transit manipulator 9, and the specific structure of the unloading manipulator 60 will not be described in detail here. For the specific structures of the unloading-buffering-mating pull belt 20, the unloading pull belt 30, and the defective unloading pull belt 40, reference may be made to the related art and there will be no repeating here.

In some embodiments of the present disclosure, as shown in FIGS. 1, 15, and 26, an incoming material spacing-varying pull belt 50 is provided upstream of the incoming material code-scanning apparatus 3. The incoming material spacing-varying pull belt 50 is capable of regulating the position of the battery 100 in a direction perpendicular to a conveying direction of the incoming material spacing-varying pull belt 50, such that the battery 100 can be regulated to be aligned with individual conveying channels in the incoming material code-scanning apparatus 3, thereby enabling the battery 100 to be conveyed to that conveying channel aligned therewith.

Exemplarily, as shown in FIGS. 15 and 26, the incoming material spacing-varying pull belt 50 has two incoming material stations, and the incoming material code-scanning apparatus 3 has four conveying channels. The incoming material spacing-varying pull belt 50 may input batteries 100 into all the four conveying channels by regulating the positions of the two incoming material stations.

For the specific structure of the incoming material spacing-varying pull belt 50, reference may be made to the related art and there will be no repeating here.

In some embodiments of the present disclosure, as shown in FIG. 1, the incoming material spacing-varying pull belt 50 conveys the battery 100 to the incoming material code-scanning apparatus 3 along the first direction X, the incoming material code-scanning apparatus 3 conveys the battery 100 to the preliminary weighing apparatus 4 along the first direction X, the defective incoming pull belt 10 is located on a side of the preliminary weighing apparatus 4 along the second direction Y, the liquid injection apparatus 1 is located on a side of the defective incoming pull belt 10 facing away from the preliminary weighing apparatus 4 along the second direction Y, the liquid injection loading-unloading manipulator 6 grabs the unqualified battery 100 from an output end of the preliminary weighing apparatus 4 and transfers to the defective incoming pull belt 10, the liquid injection loading-unloading manipulator 6 grabs the qualified battery 100 from an output end of the preliminary weighing apparatus 4 and transfers to the battery clamp 11 of the liquid injection apparatus 1, the battery 100 with the electrolyte injected via the liquid injection apparatus 1 is transferred from the battery clamp 11 to the first transit apparatus 7 by the liquid injection loading-unloading manipulator 6, the first transit apparatus 7 conveys the battery 100 to the subsequent weighing apparatus 5 along the first direction X, the subsequent weighing apparatus 5 conveys the battery 100 to the second transit apparatus 8 along the first direction X, the nailing transit manipulator 9 grabs the battery 100 from the second transit apparatus 8 and transfers to a loading end of the nailing conveying mechanism 21 along the second direction Y, the nailing conveying mechanism 21 conveys the battery 100 along the second direction Y, and the unloading manipulator 60 grabs the battery 100 from an unloading end of the nailing conveying mechanism 21 and transfers the battery 100 to the unloading-buffering-mating pull belt 20, the unloading pull belt 30, or the defective unloading pull belt 40.

As such, by limiting the conveying direction of each apparatus, each mechanism of the entire liquid injection device is reasonable in layout and occupies a small space.

Figure 27:
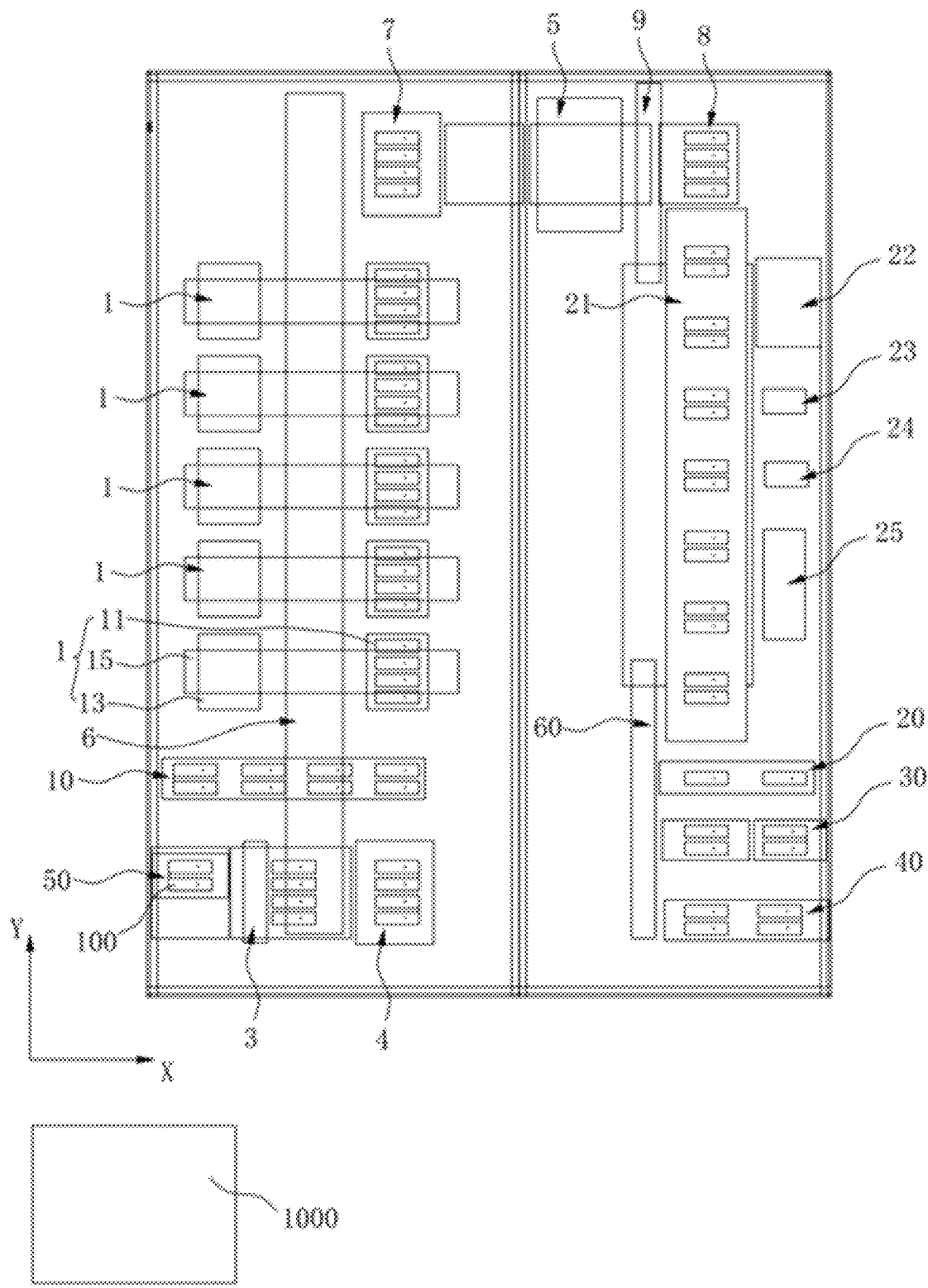
FIG. 27 is a top view of a battery production line according to some embodiments of the present disclosure.

FIG. 27 is a top view of a battery production line according to some embodiments of the present disclosure.

A second aspect of the present disclosure provides a battery production line, as shown in FIG. 27, the battery production line includes a battery casing apparatus 1000 and a liquid injection device provided in the first aspect, the battery casing apparatus 1000 is configured to load a bare battery cell into a case to form a battery 100, and the liquid injection device is disposed downstream of the battery casing apparatus 1000.

Since the battery production line includes the liquid injection device, the battery production line having all the beneficial effects of the liquid injection device, the battery production line can improve the accuracy of butting at battery liquid injection, thereby improving the yield of batteries.

Figure 28:
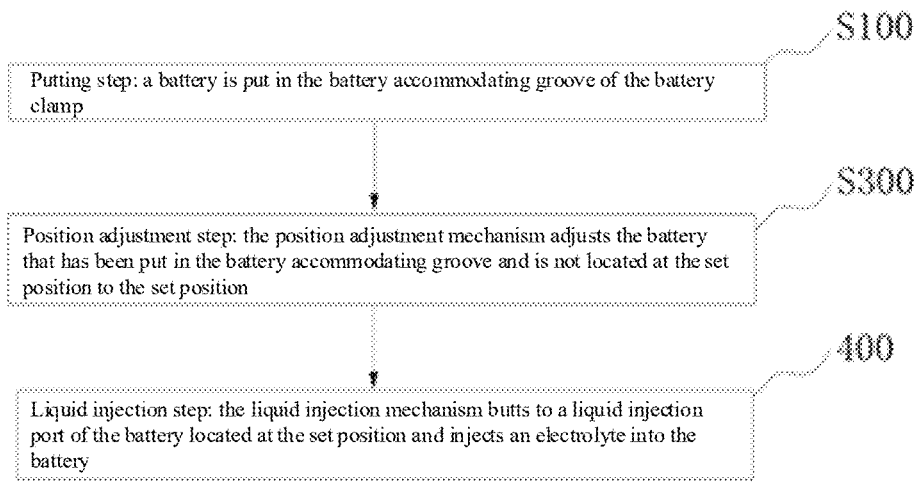
FIG. 28 is a first flowchart of a liquid injection method according to some embodiments of the present disclosure.
Figure 29:
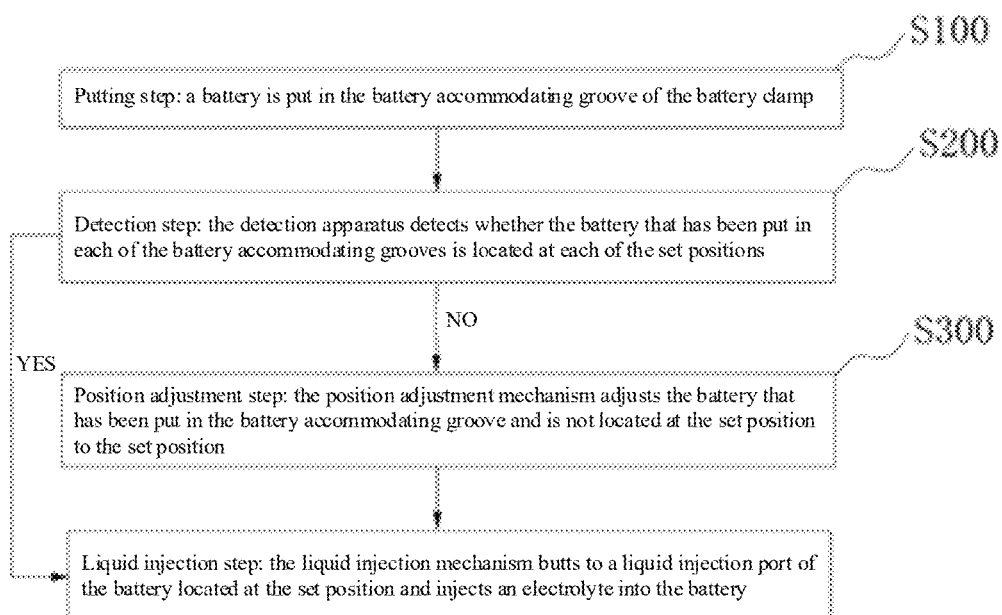
FIG. 29 is a second flowchart of a liquid injection method according to some embodiments of the present disclosure.
Figure 30:
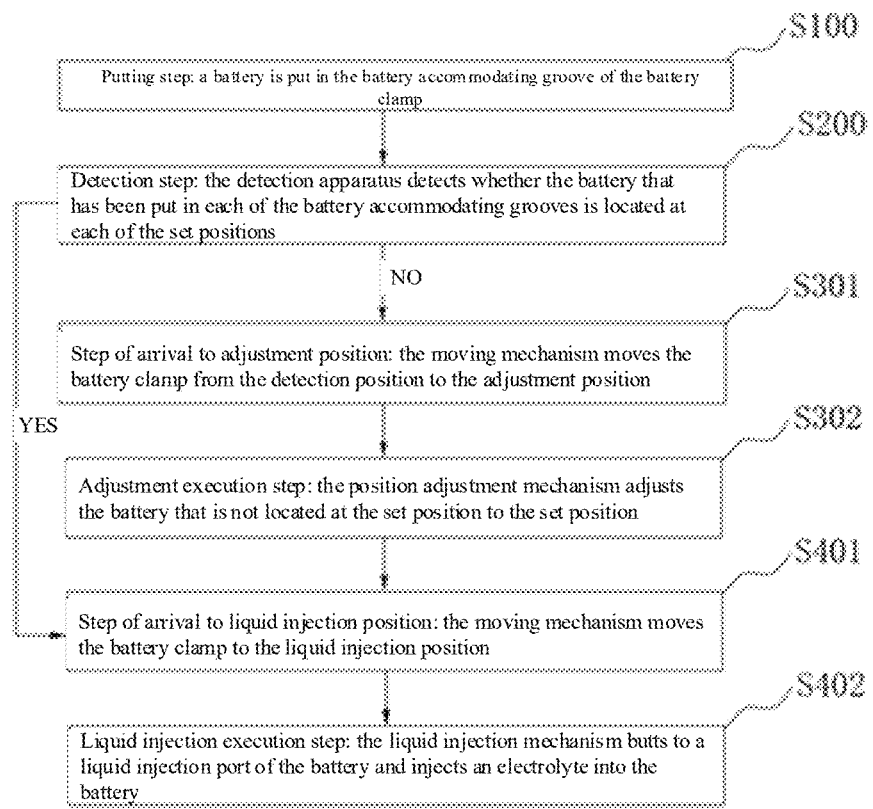
FIG. 30 is a third flowchart of a liquid injection method according to some embodiments of the present disclosure.
Figure 31:
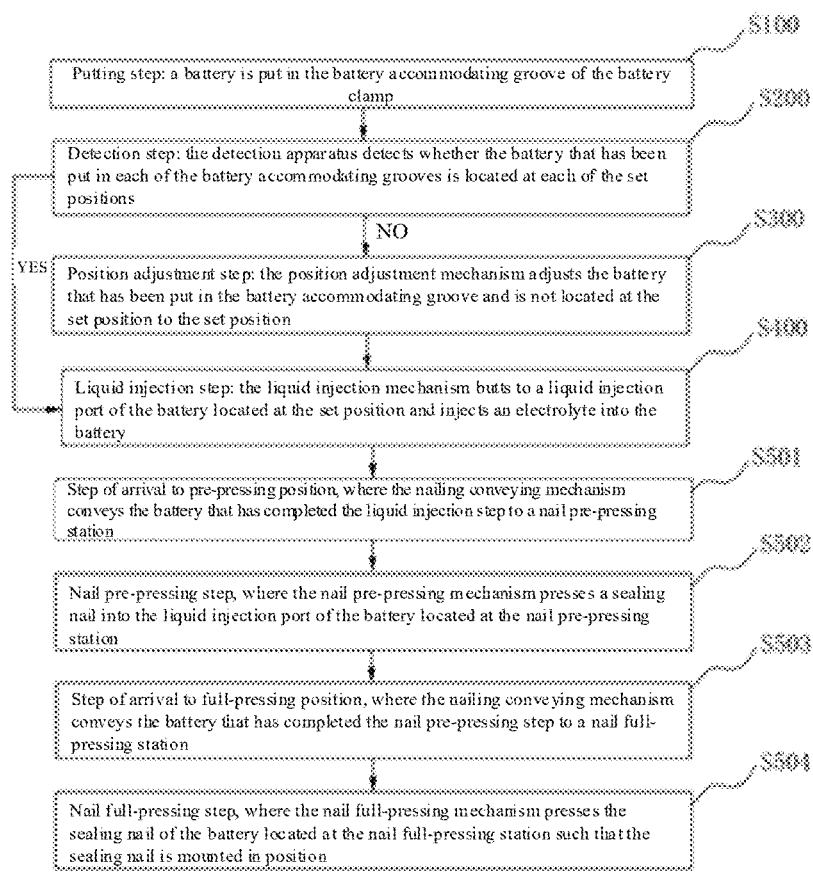
FIG. 31 is a fourth flowchart of a liquid injection method according to some embodiments of the present disclosure.
Figure 32:
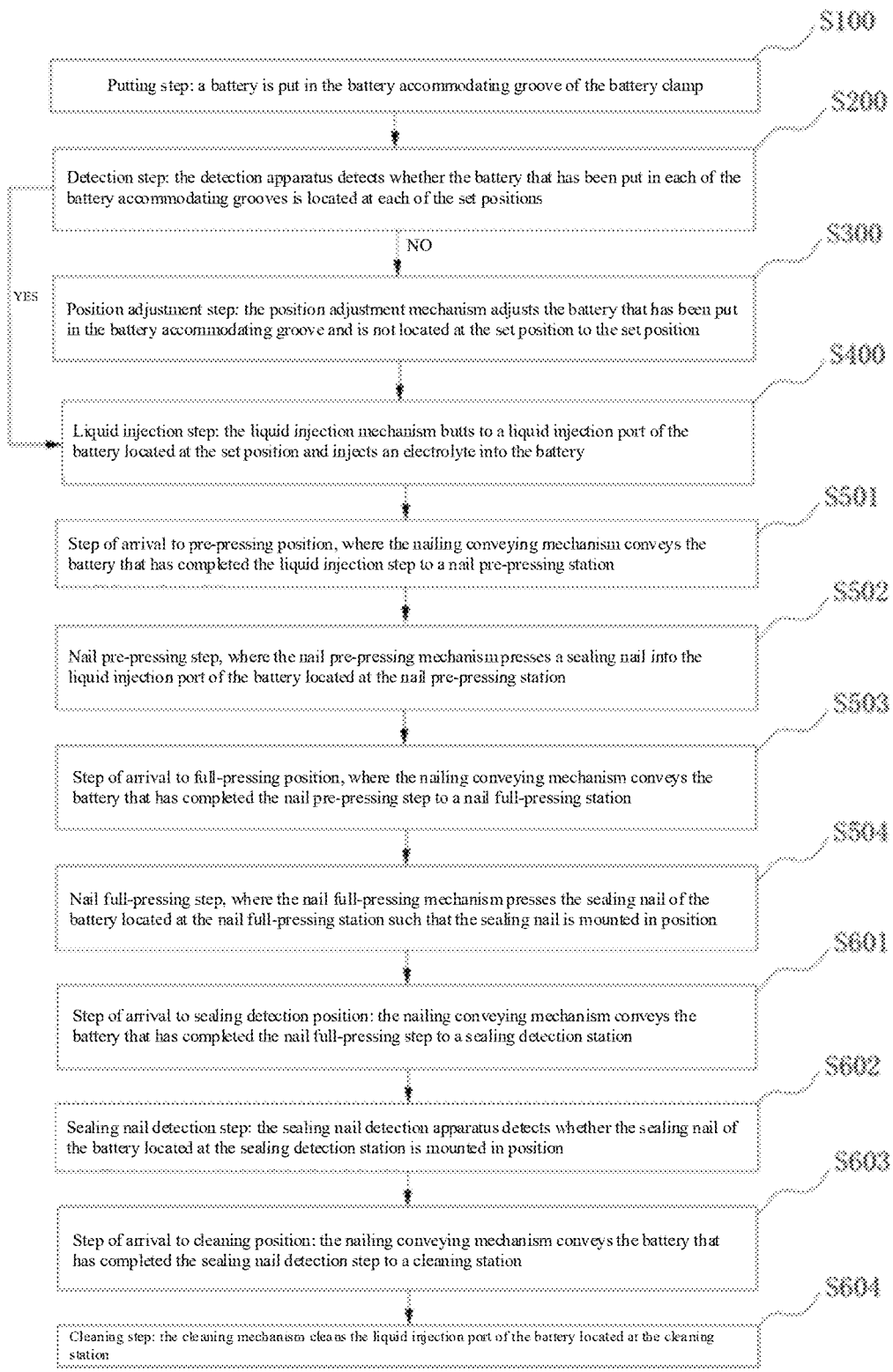
FIG. 32 is a fifth flowchart of a liquid injection method according to some embodiments of the present disclosure.
Figure 33:
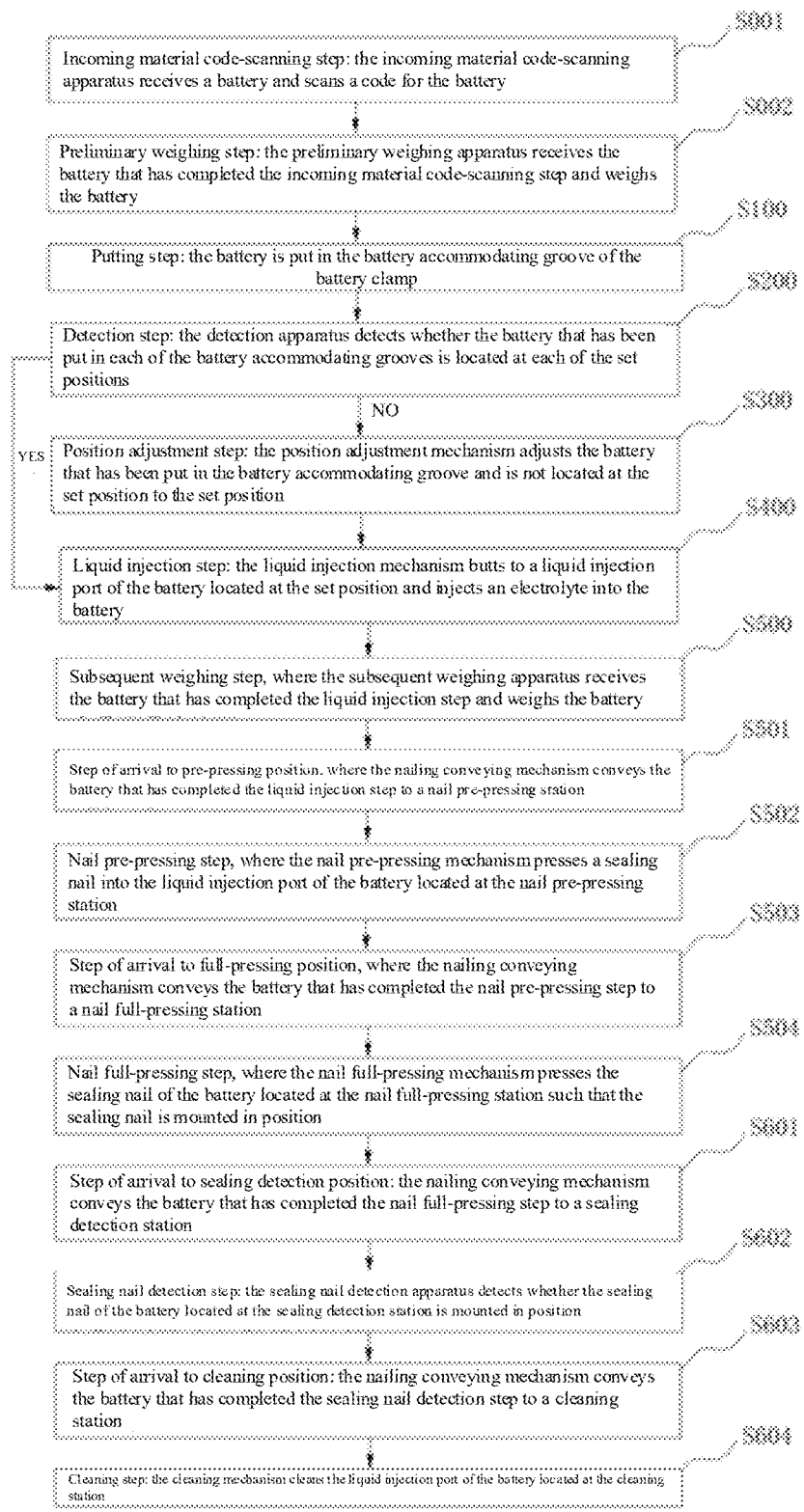
FIG. 33 is a sixth flowchart of a liquid injection method according to some embodiments of the present disclosure.

FIG. 28 is a first flowchart of a liquid injection method according to some embodiments of the present disclosure; FIG. 29 is a second flowchart of a liquid injection method according to some embodiments of the present disclosure; FIG. 30 is a third flowchart of a liquid injection method according to some embodiments of the present disclosure; FIG. 31 is a fourth flowchart of a liquid injection method according to some embodiments of the present disclosure; FIG. 32 is a fifth flowchart of a liquid injection method according to some embodiments of the present disclosure; and FIG. 33 is a sixth flowchart of a liquid injection method according to some embodiments of the present disclosure.

A third aspect of the present disclosure provides a liquid injection method using a liquid injection device, the liquid injection device includes a liquid injection apparatus 1, the liquid injection apparatus 1 includes a battery clamp 11, a position adjustment mechanism 12, and a liquid injection mechanism 13, the battery clamp 11 is provided with at least one battery accommodating groove, and the battery accommodating groove has a set position within;

as shown in FIG. 28, the liquid injection method includes:
S100, a putting step: a battery is put in the battery accommodating groove of the battery clamp;
S300, a position adjustment step: the position adjustment mechanism adjusts the battery that has been put in the battery accommodating groove and is not located at the set position to the set position;
and S400, a liquid injection step: the liquid injection mechanism butts to a liquid injection port of the battery located at the set position and injects an electrolyte into the battery.

When liquid injection is performed on the battery with the liquid injection method provided in the embodiments of the present disclosure, the battery 100 is first put in the battery accommodating groove of the battery clamp 11. For the battery 100 that is not located at the set position, position adjustment is performed with the position adjustment mechanism 12 such that the battery 100 moves to the set position. Since the position of the battery 100 is corrected, the liquid injection mechanism 13 can be accurately butted to the liquid injection port of the battery 100, thereby enabling improvement in the accuracy of butting of the liquid injection mechanism 13 to the liquid injection port of the battery 100.

In some embodiments of the present disclosure, the liquid injection apparatus 1 further includes a detection apparatus 14. As shown in FIG. 29, the liquid injection method further includes, after the putting step S100:
S200, a detection step: the detection apparatus detects whether the battery that has been put in each of the battery accommodating grooves is located at each of the set positions.

If it is detected that at least one battery is not located at the set position, the method proceeds to the position adjustment step S300, and if it is detected that each of the batteries is located at each of the set positions, the method proceeds to the liquid injection step S400.

Through the detection by the detection apparatus 14, it is possible to judge whether the battery 100 put in the battery clamp 11 needs to be subjected to position adjustment. The position adjustment mechanism 12 is used when needed, and the position adjustment mechanism 12 may not be used when not needed. As such, automatic detection is achieved, the accuracy and efficiency of detection are improved, and some useless operations by the position adjustment mechanism 12 may further be omitted, improving the operational efficiency of battery liquid injection.

In some embodiments of the present disclosure, an upper portion of the battery accommodating groove is provided with an access groove mouth 111. In the position adjustment step S300, the position adjustment mechanism 12 presses the battery 100 from top down, such that the battery 100 that is not located at the set position is moved to the set position.

The access groove mouth 111 is provided in the upper portion of the battery accommodating groove, such that a putting-in direction for the battery 100 is from top down, that is, the battery 100 needs to be mounted within the battery accommodating groove from top down. In this case, after the battery 100 is put through the access groove mouth 111 from top down, the battery 100 may be released. The battery 100 automatically moves down under the action of gravity and continues to enter the battery accommodating groove. A pushing action of continuing to push the battery 100 in may be omitted, which is conducive to improving the efficiency of operation.

In some embodiments of the present disclosure, the liquid injection apparatus 1 further includes a moving mechanism 15, and the battery clamp 11 is provided at the moving mechanism 15, and capable of moving between a detection position, an adjustment position, and a liquid injection position under the action of the moving mechanism 15.

As shown in FIG. 30, the position adjustment step S300 includes:
S301, a step of arrival to adjustment position: the moving mechanism moves the battery clamp from the detection position to the adjustment position;
and S302, an adjustment execution step: the position adjustment mechanism adjusts the battery that is not located at the set position to the set position;
the liquid injection step S400 includes:
S401, a step of arrival to liquid injection position: the moving mechanism moves the battery clamp to the liquid injection position;
and S402, a liquid injection execution step: the liquid injection mechanism butts to the liquid injection port of the battery and injects the electrolyte into the battery.

The moving mechanism 15 is used to transfer the battery 100 between the detection position, the adjustment position, and the liquid injection position to carry forward the subsequent adjustment execution step or liquid injection execution step such that the liquid injection operation proceeds smoothly.

In some embodiments of the present disclosure, the liquid injection device further includes a nailing conveying mechanism 21, a nail pre-pressing mechanism 22, and a nail full-pressing mechanism 23. As shown in FIG. 31, the liquid injection method further includes, after the liquid injection step S400:

S501, a step of arrival to pre-pressing position: the nailing conveying mechanism conveys the battery that has completed the liquid injection step to a nail pre-pressing station;
S502, a nail pre-pressing step: the nail pre-pressing mechanism presses a sealing nail into the liquid injection port of the battery located at the nail pre-pressing station;
S503, a step of arrival to full-pressing position: the nailing conveying mechanism conveys the battery that has completed the nail pre-pressing step to a nail full-pressing station;
and S504, a nail full-pressing step: the nail full-pressing mechanism presses the sealing nail of the battery located at the nail full-pressing station such that the sealing nail is mounted in position.

The nailing conveying mechanism 21 first conveys the battery 100 that has completed the liquid injection step S400 to the nail pre-pressing station, and the nail pre-pressing mechanism 22 presses the sealing nail into the liquid injection port of the battery 100 that has been conveyed to the nail pre-pressing station. Then, the nailing conveying mechanism 21 conveys the battery 100 with the sealing nail pressed therein to the nail full-pressing station, and the nail full-pressing mechanism 23 presses the sealing nail located in the battery 100 that has been conveyed to the nail full-pressing station, such that the sealing nail is mounted in position, thereby completing sealing of the liquid injection port. As such, the sealing of the liquid injection port of the battery 100 is achieved, and the chances of battery 100 leakage are reduced.

In some embodiments of the present disclosure, the liquid injection device further includes a sealing nail detection apparatus 24 and a cleaning mechanism 25. As shown in FIG. 32, the liquid injection method further includes, after the nail full-pressing step S504:

S601, a step of arrival to sealing detection position: the nailing conveying mechanism conveys the battery that has completed the nail full-pressing step to a sealing detection station;
S602, a sealing nail detection step: the sealing nail detection apparatus detects whether the sealing nail of the battery located at the sealing detection station is mounted in position;
S603, a step of arrival to cleaning position: the nailing conveying mechanism conveys the battery that has completed the sealing nail detection step to a cleaning station;
and S604, a cleaning step: the cleaning mechanism cleans the liquid injection port of the battery located at the cleaning station.

As such, by detecting whether mounting of the sealing nail is qualified, it is convenient to subsequently pick out unqualified products. By cleaning the liquid injection port, the cleanliness level of the battery 100 is increased.

In some embodiments of the present disclosure, the liquid injection device further includes an incoming material code-scanning apparatus 3, a preliminary weighing apparatus 4, and a subsequent weighing apparatus 5. As shown in FIG. 33, the liquid injection method further includes, before the putting step S100:

S001, an incoming material code-scanning step: the incoming material code-scanning apparatus receives a battery and scans a code for the battery;

and S002, a preliminary weighing step: the preliminary weighing apparatus receives the battery that has completed the incoming material code-scanning step and weighs the battery;

the liquid injection method further includes, between the liquid injection step S400 and the step of arrival to pre-pressing position S501:

S500, a subsequent weighing step: the subsequent weighing apparatus receives the battery that has completed the liquid injection step and weighs the battery.

By measuring weight of the battery 100 before liquid injection and weight after liquid injection, it is possible to infer whether the weight of the battery 100 before liquid injection and the weight of the battery 100 after liquid injection are qualified, so as to screen out unqualified batteries 100.

Specific examples of some embodiments of the present disclosure are described below in connection with the accompanying drawings.

As one specific example, the liquid injection device is of a linear layout, including a loading butting pull belt (incoming material spacing-varying pull belt 50), a preliminary code-scanning apparatus (incoming material code-scanning apparatus 3), a preliminary weighing apparatus (preliminary weighing apparatus 4), a loading-unloading manipulator (liquid injection loading-unloading manipulator 6), a liquid injection module (liquid injection apparatus 1), a defect pull belt (defective incoming pull belt 10), a subsequent code-scanning weighing apparatus (subsequent weighing apparatus 5), a transit manipulator (a first transit apparatus 7), a nailing pull belt (nailing conveying mechanism 21), a plastic nail pressing apparatus (nail pre-pressing mechanism 22 and nail full-pressing mechanism 23), and a wiping apparatus (cleaning mechanism 25).

When the liquid injection device is used for liquid injection, the battery enters the liquid injection device through the loading butting pull belt, and is subjected sequentially to code scanning with the preliminary code-scanning apparatus and weighing with the preliminary weighing apparatus before reaching a loading station; the loading manipulator (loading gripper 64) grabs the battery, puts a defective battery in the defect pull belt when there is the defective product, and in normal circumstances, put the battery in a liquid injection clamp (battery clamp 11); after being loaded with the battery, the liquid injection clamp is moved below a liquid injection station (liquid injection unit 132) via a transport module (moving mechanism 15); the liquid injection station descends to evacuate the battery, and then a liquid injection pump prepares and adds the liquid into a cup body of the liquid injection station (liquid injection cup 1324), and after liquid preparation is completed, a liquid injection valve (liquid injection valve 1328) is opened, and an electrolyte flows into the battery for liquid injection; after the liquid injection is completed (the electrolyte completely enters the battery), the liquid injection fixture is removed, and an unloading manipulator (unloading gripper 67) starts unloading; the unloaded battery is scanned and weighed by the subsequent code-scanning weighing apparatus, then the transit manipulator puts the battery in the nailing pull belt, and a plastic nail is pressed via the nail pre-pressing mechanism 22 and the nail full-pressing mechanism 23 to seal a liquid injection hole (liquid injection port); then the battery is wiped by the wiping apparatus and traffics out.

The loading-unloading manipulator adopts linear motor double rotors for loading and unloading, enabling high-rate battery liquid injection. Moreover, the liquid injection device is fully automatic for liquid injection and has comprehensive functions. Manual intervention is not required, reducing manpower input. Up to 16 products are produced per minute on a single device, which is cost-effective.

The above embodiments are merely used for illustrating rather than limiting the technical solutions of the present disclosure. Although the present disclosure has been described in detail with reference to the above various embodiments, those of ordinary skill in the art should understand that the technical solutions specified in the above various embodiments can still be modified, or some or all of the technical features therein can be equivalently substituted; and such modifications or substitutions do not make the essence of the corresponding technical solutions depart from the scope of the technical solutions of the various embodiments of the present disclosure, which shall fall within the scope of the specification of the present disclosure. In particular, the technical features mentioned in the various embodiments can be combined in any manner as long as there is no structural conflict.

INDUSTRIAL APPLICABILITY

The present disclosure provides a liquid injection device, a battery production line, and a liquid injection method, which can improve the accuracy of butting to a liquid injection port of a battery. Since the position adjustment mechanism of the liquid injection device can adjust the position for a battery that is not located at a set position, the battery is moved to the set position. Since the position of the battery is corrected, the liquid injection mechanism can be accurately butted to a liquid injection port of the battery, thereby enabling improvement in the accuracy of butting of the liquid injection mechanism to the liquid injection port of the battery. Moreover, an access groove mouth is provided in an upper portion of a battery accommodating groove, such that a putting-in direction for the battery is from top down, that is, the battery needs to be mounted within the battery accommodating groove from top down. In this case, after the battery is put through the access groove mouth from top down, the battery may be released. The battery automatically moves down under the action of gravity and continues to enter the battery accommodating groove. A pushing action of continuing to push the battery in may be omitted, which is conducive to improving the efficiency of operation. In the case that the battery is stuck and cannot continue to move down, resulting in inability to move to the set position, the battery may be pushed to the set position by means of the position adjustment mechanism pressing the battery from top down, thereby enabling regulation of the battery position. Such regulation means is simple in action and has high regulation efficiency.

What is claimed is:

1. A liquid injection device, comprising a liquid injection apparatus, the liquid injection apparatus comprising:
   a battery clamp, the battery clamp being provided with at least one battery accommodating groove, the battery accommodating groove having a set position therein;
   a position adjustment mechanism, the position adjustment mechanism being configured to be capable of adjusting a battery that has been put in the battery accommodating groove and is not located at the set position to the set position; and
   a liquid injection mechanism, the liquid injection mechanism being configured to be capable of butting to a liquid injection port of a battery located at the set position and performing a liquid injection operation for injecting an electrolyte into the battery;

wherein an upper portion of the battery accommodating groove being provided with an access groove mouth, and the position adjustment mechanism being configured to be capable of pressing a battery from top down such that the battery moves to the set position within the battery accommodating groove.

2. The liquid injection device according to claim 1, wherein the liquid injection apparatus further comprises a detection apparatus, the detection apparatus being configured to be capable of detecting whether a battery put in each of the battery receiving grooves is located at each of the set positions, and if it is detected that at least one battery is not located at the set position, adjusting the battery that is not located at the set position to the set position through the position adjustment mechanism.

3. The liquid injection device according to claim 2, wherein:
a battery is located at the set position if the battery is fully accommodated within the battery accommodating groove; and
the detection apparatus is disposed outside the access groove mouth, and if part of the battery extends out of the battery accommodating groove from the access groove mouth, the detection apparatus is triggered.

4. The liquid injection device according to claim 2, wherein:
the liquid injection apparatus further comprises a moving mechanism, the battery clamp is provided at the moving mechanism, and capable of moving between a detection position, an adjustment position, and a liquid injection position under the action of the moving mechanism; and
the detection apparatus detects the battery within the battery clamp located at the detection position, if it is detected that at least one battery is not located at the set position, the moving mechanism moves the battery clamp to the adjustment position such that the position adjustment mechanism adjusts the battery, and if it is detected that each of the batteries is located at each of the set positions, the moving mechanism moves the battery clamp to the liquid injection position such that the liquid injection mechanism injects the electrolyte into the battery.

5. The liquid injection device according to claim 1, wherein the liquid injection apparatus further comprises a liquid injection base, and at least part of the position adjustment mechanism and at least part of the liquid injection mechanism are disposed on opposite two sides of the liquid injection base, respectively.

6. The liquid injection device according to claim 5, wherein the position adjustment mechanism comprises:
a down-pressing pedestal, the down-pressing pedestal being mounted at one side of the liquid injection base; and
a down-pressing structure, the down-pressing structure being provided at the down-pressing pedestal and capable of ascending or descending in relation to the down-pressing pedestal, and the down-pressing structure being capable of pressing the battery from top down in a descending process.

7. The liquid injection device according to claim 6, wherein the liquid injection mechanism comprises:
a liquid injection mount, the liquid injection mount being mounted at the other side of the liquid injection base opposite to the down-pressing pedestal and capable of ascending or descending in relation to the liquid injection base; and a liquid injection unit, the liquid injection unit being mounted at the liquid injection mount, and the liquid injection unit being configured to be capable of injecting the electrolyte into the battery butted thereto;
wherein in a process of the liquid injection mount descending, the liquid injection unit is capable of being brought to butt to the battery located at the set position.

8. The liquid injection device according to claim 7, wherein:
the down-pressing pedestal has a mounting space therein; and
the liquid injection mechanism further comprises:
a residual liquid receiving driving member, mounted within the mounting space of the down-pressing pedestal; and
a residual liquid receiving box, connected to an output end of the residual liquid receiving driving member, the residual liquid receiving box being capable of moving between a residual liquid receiving position and a retracted position under the driving of the residual liquid receiving driving member, the residual liquid receiving box located at the residual liquid receiving position being located below a liquid outlet nozzle of the liquid injection unit and capable of butting to the liquid outlet nozzle of the liquid injection unit to receive a residual liquid flowing out of the liquid injection unit, and the residual liquid receiving box located at the retracted position being misaligned with the liquid outlet nozzle of the liquid injection unit in the vertical direction.

9. The liquid injection device according to claim 1, wherein the battery clamp comprises an outer box and at least one partition plate provided within the outer box, and the partition plate partitions a space within the outer box into at least two battery accommodating grooves.

10. The liquid injection device according to claim 1, further comprising:
a nailing conveying mechanism, configured to convey the battery after the liquid injection operation is completed, and capable of conveying the battery sequentially to a nail pre-pressing station and a nail full-pressing station;
a nail pre-pressing mechanism, configured to press a sealing nail into the liquid injection port of the battery located at the nail pre-pressing station; and
a nail full-pressing mechanism, configured to press the sealing nail of the battery located at the nail full-pressing station such that the sealing nail is mounted in position.

11. The liquid injection device according to claim 10, wherein the nailing conveying mechanism comprises:
a conveyor belt, configured to transmit power along a conveying direction; and
at least two fixed blocks, sequentially provided along the conveying direction and connected to the conveyor belt, the adjacent fixed blocks being used to limit opposite two sides of the battery, and a spacing of the adjacent fixed blocks being adjustable.

12. The liquid injection device according to claim 11, wherein:
the conveyor belt comprises a first conveyor belt and a second conveyor belt disposed side by side along a direction perpendicular to the conveying direction, adjacent two of the fixed blocks are, respectively, connected to the first conveyor belt and the second conveyor belt, the first conveyor belt and the second conveyor belt are configured to be capable of synchronously transmitting power along the conveying direction to convey the battery; and the first conveyor belt and the second conveyor belt are also configured to be capable of moving relatively along the conveying direction to regulate a spacing of the adjacent two of the fixed blocks.

13. The liquid injection device according to claim 12, wherein the conveyor belt further comprises a third conveyor belt, the third conveyor belt is disposed at a side of the second conveyor belt facing away from the first conveyor belt, the fixed blocks connected to the first conveyor belt are connected to the third conveyor belt, and the first conveyor belt and the third conveyor belt transmit power synchronously.

14. The liquid injection device according to claim 11, wherein:

the nailing conveying mechanism further comprises a first positioning assembly and a second positioning assembly, the first positioning assembly and the second positioning assembly are provided on opposite two sides of the conveyor belt; and the first positioning assembly and the second positioning assembly are configured to be capable of pushing the battery from two sides of the battery in a direction perpendicular to the conveying direction to limit the position of the battery.

15. The liquid injection device according to claim 14, wherein the first positioning assembly comprises a first pushing member, the first pushing member is provided with a limiting groove, the limiting groove comprises a first pushing face facing the second positioning assembly and two limiting faces facing each other along the conveying direction, and the first pushing member is configured to be capable of moving toward the second positioning assembly such that the limiting groove is engaged to the battery.

16. The liquid injection device according to claim 15, wherein the second positioning assembly comprises a clamping structure, the clamping structure comprises a first clamping head and a second clamping head, the first clamping head and the second clamping head are both provided with a clamping face and a second pushing face, the clamping faces of the first clamping head and the second clamping head face each other in the conveying direction, the second pushing faces both face the first pushing member, the first clamping head and the second clamping head are configured to be capable of moving close to or far away from the first pushing member, and capable of moving close to or far away from each other in the conveying direction.

17. The liquid injection device according to claim 10, wherein the nailing conveying mechanism is further capable of conveying the battery to a detection station located downstream of the nail full-pressing station;

the liquid injection device further comprising:

a sealing nail detection apparatus, wherein the sealing nail detection apparatus is configured to detect whether a sealing nail of the battery located at the detection station is mounted in position.

18. The liquid injection device according to claim 17, wherein the nailing conveying mechanism is further capable of conveying the battery to a cleaning station located downstream of the detection station;

the liquid injection device further comprising:

a cleaning mechanism, wherein the cleaning mechanism is configured to clean the liquid injection port of the battery located at the cleaning station.

19. A battery production line, comprising:

a battery casing apparatus, configured to load a bare battery cell into a case to form a battery; and the liquid injection device according to claim 1, the liquid injection device being disposed downstream of the battery casing apparatus.

20. A liquid injection method using a liquid injection device, the liquid injection device comprising a liquid injection apparatus, the liquid injection apparatus comprising a battery clamp, a position adjustment mechanism, and a liquid injection mechanism, the battery clamp being provided with at least one battery accommodating groove, the battery accommodating groove having a set position within; an upper portion of the battery accommodating groove being provided with an access groove mouth, the position adjustment mechanism being configured to be capable of pressing a battery from top down such that the battery moves to the set position within the battery accommodating groove, the liquid injection method comprising:

a putting step, where a battery is put in the battery accommodating groove of the battery clamp;

a position adjustment step, where the position adjustment mechanism adjusts the battery that has been put in the battery accommodating groove and is not located at the set position to the set position; and a liquid injection step, where the liquid injection mechanism butts to a liquid injection port of the battery located at the set position and injects an electrolyte into the battery.

* * * * *